(12) United States Patent
Niizuma et al.

(10) Patent No.: US 12,553,874 B2
(45) Date of Patent: Feb. 17, 2026

(54) SENSOR ELEMENT AND GAS SENSOR

(71) Applicant: NGK INSULATORS, LTD., Aichi (JP)

(72) Inventors: Shotaro Niizuma, Kasugai (JP);
Yusuke Watanabe, Nagoya (JP);
Toshihiro Hirakawa, Kasugai (JP);
Kirari Takahashi, Ikeda (JP)

(73) Assignee: NGK INSULATORS, LTD., Nagoya (JP)

( * ) Notice: Subject to any disclaimer, the term of this patent is extended or adjusted under 35 U.S.C. 154(b) by 647 days.

(21) Appl. No.: 17/948,475

(22) Filed: Sep. 20, 2022

(65) Prior Publication Data
US 2023/0091237 A1 Mar. 23, 2023

(30) Foreign Application Priority Data
Sep. 22, 2021 (JP) ................. 2021-153963

(51) Int. Cl.
*G01N 33/00* (2006.01)
(52) U.S. Cl.
CPC ..... *G01N 33/0011* (2013.01); *G01N 33/0037* (2013.01); *G01N 33/0054* (2013.01)
(58) Field of Classification Search
CPC .......... G01N 33/0011; G01N 33/0037; G01N 33/0054
See application file for complete search history.

(56) References Cited

U.S. PATENT DOCUMENTS 7,445,700 B2 * 11/2008 Kato .................. G01N 27/417
73/23.31
10,730,743 B2 * 8/2020 Kierse ................. H01L 23/3185
(Continued)

FOREIGN PATENT DOCUMENTS

JP 2015-200643 A 11/2015
JP 2018146346 A * 9/2018
(Continued)

OTHER PUBLICATIONS

Japanese Office Action received in corresponding Japanese Application No. 2021-153963 dated Oct. 1, 2024.

*Primary Examiner* — Eyob Hagos
(74) *Attorney, Agent, or Firm* — MATTINGLY & MALUR, PC

(57) ABSTRACT

A sensor element for detecting a specific gas concentration in a measurement-object gas includes: an element body provided with a measurement-object gas flow section therein, the measurement-object gas flow section introducing the measurement-object gas and causing the measurement-object gas to flow therethrough; a reference electrode disposed inside the element body; and a reference-gas introduction section that causes a reference gas to flow to the reference electrode, wherein the reference-gas introduction section has a reference-gas flow path, and one or more preliminary chambers which are disposed in a middle of the reference-gas flow path, and have a diffusion resistance lower than a diffusion resistance of the reference-gas flow path, and at least part of the reference-gas flow path is composed of a porous body so that any of the one or more preliminary chambers does not directly communicate with an outside of the element body.

10 Claims, 9 Drawing Sheets

(56) References Cited

U.S. PATENT DOCUMENTS

| | | | | |
|---|---|---|---|---|
| 2006/0289308 A1* | 12/2006 | Shaddock | ............... | F01N 13/08 |
| | | | | 204/424 |
| 2015/0276659 A1 | 10/2015 | Sekiya et al. | | |
| 2018/0172622 A1* | 6/2018 | Furuta | ................ | G01N 27/4067 |
| 2018/0284056 A1* | 10/2018 | Watanabe | .......... | G01N 27/4074 |
| 2019/0302049 A1* | 10/2019 | Okamoto | ............. | G01N 27/419 |
| 2019/0383766 A1* | 12/2019 | Nakagaki | ........... | G01N 27/4067 |
| 2020/0103368 A1* | 4/2020 | Nakagaki | ........... | G01N 27/4076 |
| 2020/0191744 A1* | 6/2020 | Watanabe | .......... | G01N 27/4072 |

FOREIGN PATENT DOCUMENTS

| | | | |
|---|---|---|---|
| JP | 2018-169328 A | 11/2018 | |
| JP | 2020-94899 A | 6/2020 | |
| JP | 2020091283 A * | 6/2020 | ............ F01N 11/007 |

* cited by examiner

SENSOR ELEMENT AND GAS SENSOR

CROSS-REFERENCE TO RELATED APPLICATION

The present application claims priority from Japanese Patent Application No. 2021-153963, filed on Sep. 22, 2021, the entire contents of which are incorporated herein by reference.

BACKGROUND OF THE INVENTION

1. Field of the Invention

The present invention relates to sensor elements and gas sensors.

2. Description of the Related Art

A known gas sensor in the related art detects the concentration of a specific gas, such as NOx, in measurement-object gas, such as exhaust gas of an automobile. For example, Patent Literature 1 describes a gas sensor including an elongate plate-shaped sensor element obtained by stacking a plurality of oxygen-ion-conductive solid electrolyte layers.

A schematic cross-sectional view schematically illustrating an example of the configuration of a gas sensor 900 in the related art is illustrated in FIG. 10. As shown in FIG. 10, the gas sensor 900 includes a sensor element 907. The sensor element 907 is an element having a structure in which dense oxygen-ion-conductive solid electrolyte layers 901 to 906 are stacked. In the sensor element 907, a measurement-object gas flow section that introduces a measurement-object gas is formed between the lower surface of the solid electrolyte layer 906 and the upper surface of the solid electrolyte layer 904, and a measurement electrode 944 is formed in the measurement-object gas flow section. In addition, an outer pump electrode 923 is formed on the upper surface of the solid electrolyte layer 906. In contrast, between the upper surface of the solid electrolyte layer 903 and the lower surface of the solid electrolyte layer 905, a reference-gas introduction space 943 is formed which introduces a reference gas (e.g., atmospheric gas) serving as a reference for detecting specific gas concentration in a measurement-object gas. A reference electrode 942 is formed on the upper surface of the solid electrolyte layer 903 facing the reference-gas introduction space 943. The reference electrode 942 is covered with a porous reference-gas introduction layer 948. A reference gas is introduced into the reference electrode 942 from the outside of the sensor element 907 through the reference-gas introduction space 943 and the reference-gas introduction layer 948. In the gas sensor 900, when a measurement-object gas is introduced into the measurement-object gas flow section, an electromotive force Va occurs between the measurement electrode 944 and the reference electrode 942. Pumping-out or pumping-in of oxygen is performed based on the electromotive force Va via the outer pump electrode 923 and the measurement electrode 944. The specific gas concentration in the measurement-object gas is detected based on current Ip2 at the time of pumping-out or pumping-in.

CITATION LIST

Patent Literature

PTL 1: JP 2015-200643 A

SUMMARY OF THE INVENTION

Meanwhile, in the gas sensor 900 in the related art as shown in FIG. 10, the oxygen concentration of the reference gas around the reference electrode 942 may sometimes change, which may affect to the detection accuracy of the specific gas concentration. For example, the measurement-object gas slightly enters the reference-gas introduction space 943, sometimes causing the oxygen concentration around the reference electrode 942 to decrease. As a countermeasure to this problem, oxygen may be pumped in around the reference electrode 942 by flowing a pump current between the reference electrode 942 and the outer pump electrode 923. However, even in this case, the oxygen concentration of the reference gas around the reference electrode 942 may change due to an excessive or insufficient amount of pumped-in oxygen.

The present invention has been made to solve the aforementioned problems, and a main object thereof is to reduce the change in the oxygen concentration around the reference electrode.

In order to achieve the aforementioned main object, the present invention employs the following solutions.

A sensor element according to the present invention is to detect a specific gas concentration in a measurement-object gas, the sensor element including: an element body having an oxygen-ion-conductive solid electrolyte layer and provided with a measurement-object gas flow section therein, the measurement-object gas flow section introducing the measurement-object gas and causing the measurement-object gas to flow therethrough; a reference electrode disposed inside the element body; and a reference-gas introduction section that is disposed inside the element body, and causes a reference gas to flow to the reference electrode, the reference gas serving as a reference for detecting the specific gas concentration in the measurement-object gas. The reference-gas introduction section has a reference-gas flow path, and one or more preliminary chambers which are disposed in the middle of the reference-gas flow path and have a diffusion resistance lower than that of the reference-gas flow path, and at least part of the reference-gas flow path is composed of a porous body so that any of the one or more preliminary chambers does not directly communicate with the outside of the element body.

In the sensor element, one or more preliminary chambers having a diffusion resistance lower than that of the reference-gas flow path are disposed in the middle of the reference-gas flow path of the reference-gas introduction section. Since at least part of the reference-gas flow path is composed of a porous body, any of the one or more preliminary chambers does not directly communicate with the outside of the element body. Consequently, the preliminary chambers each play a role as a buffer against change in the oxygen concentration in the reference gas, thus the change in the oxygen concentration around the reference electrode is reduced.

Here, "disposed in the middle of the reference-gas flow path" includes an aspect in which the preliminary chambers are disposed so as to intrude the reference-gas flow path, and an aspect in which the preliminary chambers are disposed so as to be in contact with the reference-gas flow path in the middle thereof. In addition, "does not directly communicate with" means that there is no communication with the outside via space only without through a porous body of which the reference-gas flow path is composed. In other words, when the preliminary chambers and the porous body are disposed so that for each of the one or more preliminary chambers, when the reference gas moves from the preliminary chamber to the outside of the element body, the reference gas necessarily passes through the porous body in the reference-gas flow path, it can be said that the preliminary chamber "does not directly communicate with" the outside of the element body.

In the sensor element of the present invention, the reference-gas introduction section may have a reference-gas chamber in which the reference electrode is disposed, and which has a diffusion resistance lower than that of the reference-gas flow path. In this manner, as with the preliminary chamber, the reference-gas chamber also fulfills the function as a buffer which reduces the change in the oxygen concentration around the reference electrode.

In the sensor element of the present invention, the capacity ratio of the total of capacities of the one or more preliminary chambers to the capacity of the reference-gas chamber may be 1.5 times or greater and 30 times or less. When the capacity ratio is 1.5 times or greater, sufficient advantages of reducing the change in the oxygen concentration around the reference electrode by the preliminary chambers are obtained. When the capacity ratio is 30 times or less, decrease in the strength of the element body due to the presence of the preliminary chambers can be reduced. The capacity ratio may be 8 times or less, or 4 times or less. The capacity of each of the one or more preliminary chambers may be less than or equal to 8 times the capacity of the reference-gas chamber, or less than or equal to 4 times the capacity of the reference-gas chamber.

In the sensor element of the present invention, the reference-gas introduction section may have a plurality of the preliminary chambers. For example, when a case where one large preliminary chamber is provided is compared with a case where a plurality of small preliminary chambers are provided, if both cases have the same total capacity of the preliminary chamber(s), the aforementioned functions as a buffer are comparable, whereas in the case where a plurality of small preliminary chambers are provided, decrease in the strength of the element body can be further reduced. Therefore, with a plurality of preliminary chambers in the reference-gas introduction section, decrease in the strength of the element body can be reduced while reducing the change in the oxygen concentration around the reference electrode. In this case, two or more preliminary chambers among the plurality of preliminary chambers may be different in size.

In the sensor element of the present invention, each of the one or more preliminary chambers may be a space or may be filled with a porous body.

The gas sensor of the present invention includes a sensor element in one of the above aspects. Therefore, this gas sensor achieves advantages similar to those of the aforementioned sensor element according to the present invention, such as reduced change in the oxygen concentration around the reference electrode.

DETAILED DESCRIPTION OF THE INVENTION

Figure 1:
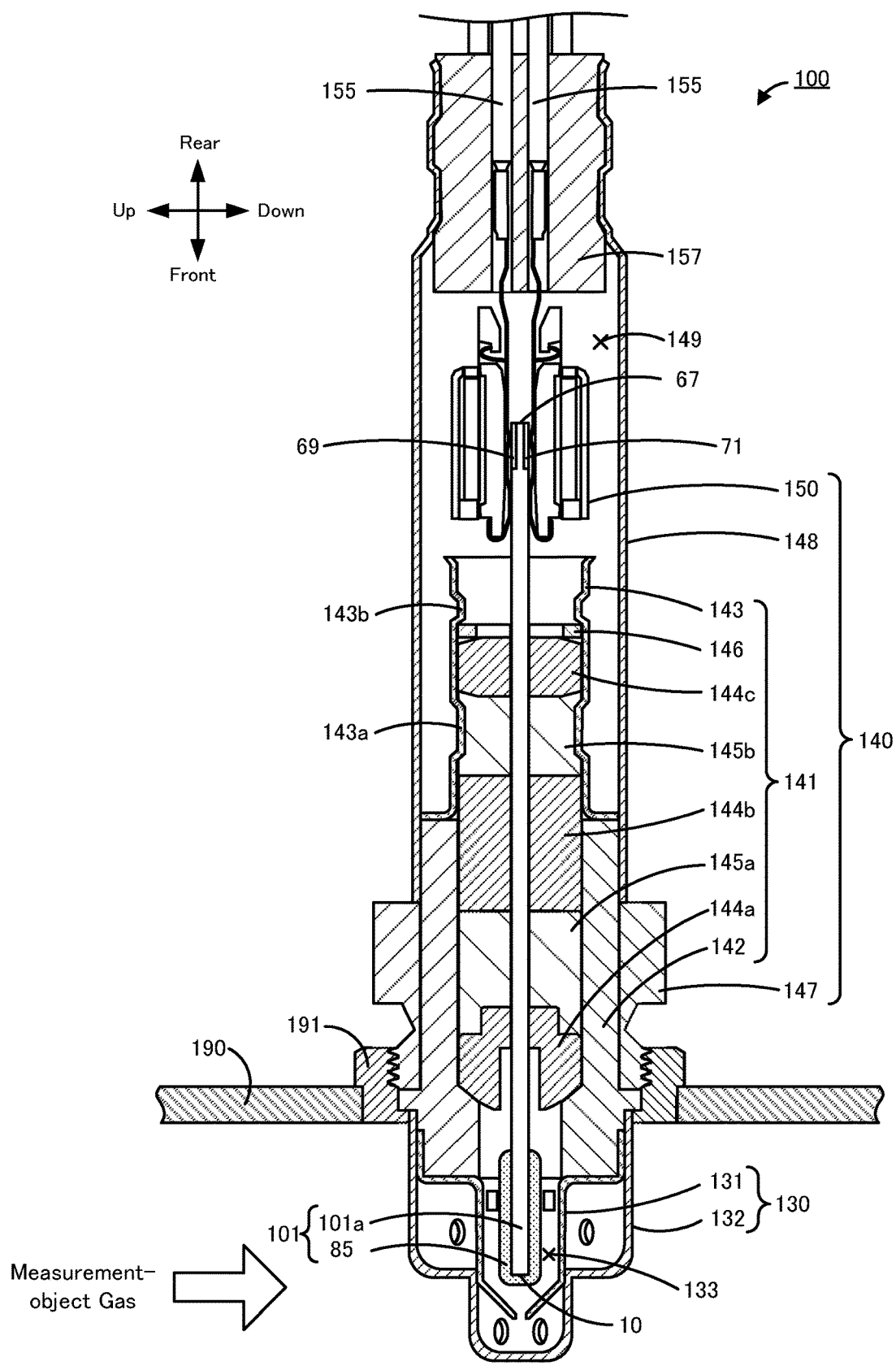
FIG. 1 is a vertical sectional view of a gas sensor 100.
Figure 2:
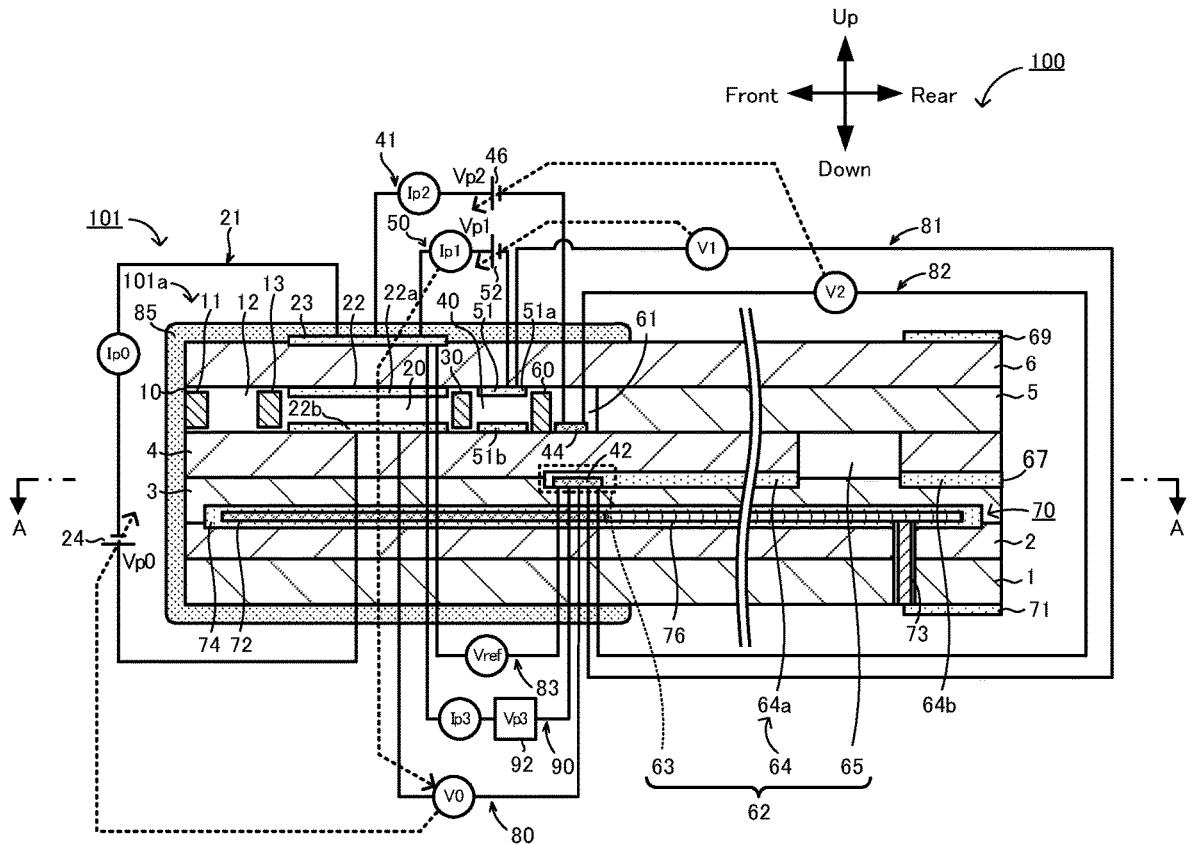
FIG. 2 is a schematic cross-sectional view schematically illustrating an example of the configuration of a sensor element 101.
Figure 3:
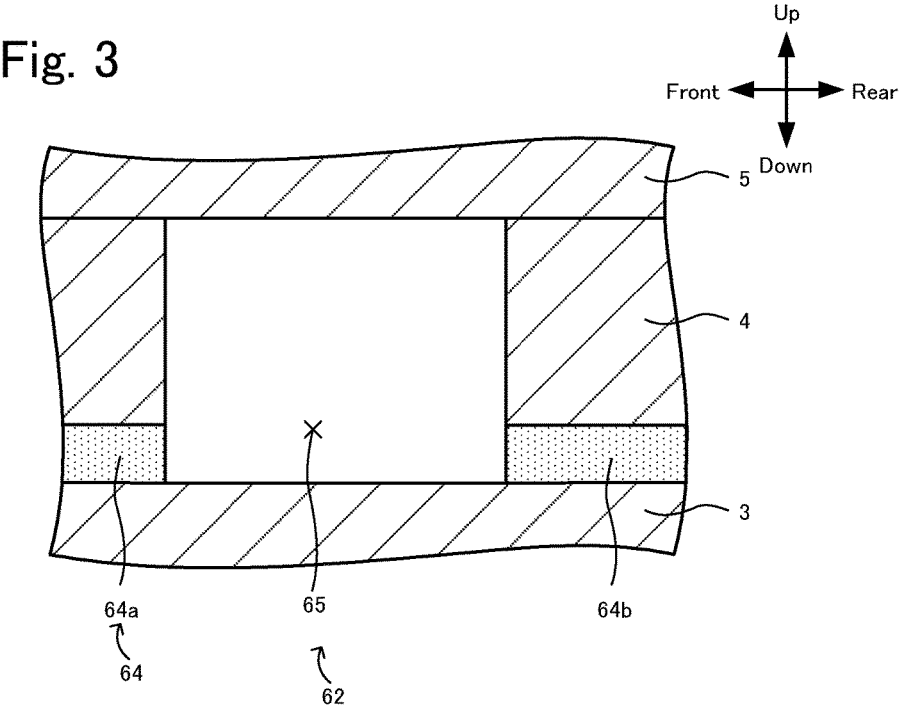
FIG. 3 is a partial cross-sectional view of a preliminary chamber 65 of the sensor element 101 and the periphery thereof.
Figure 4:
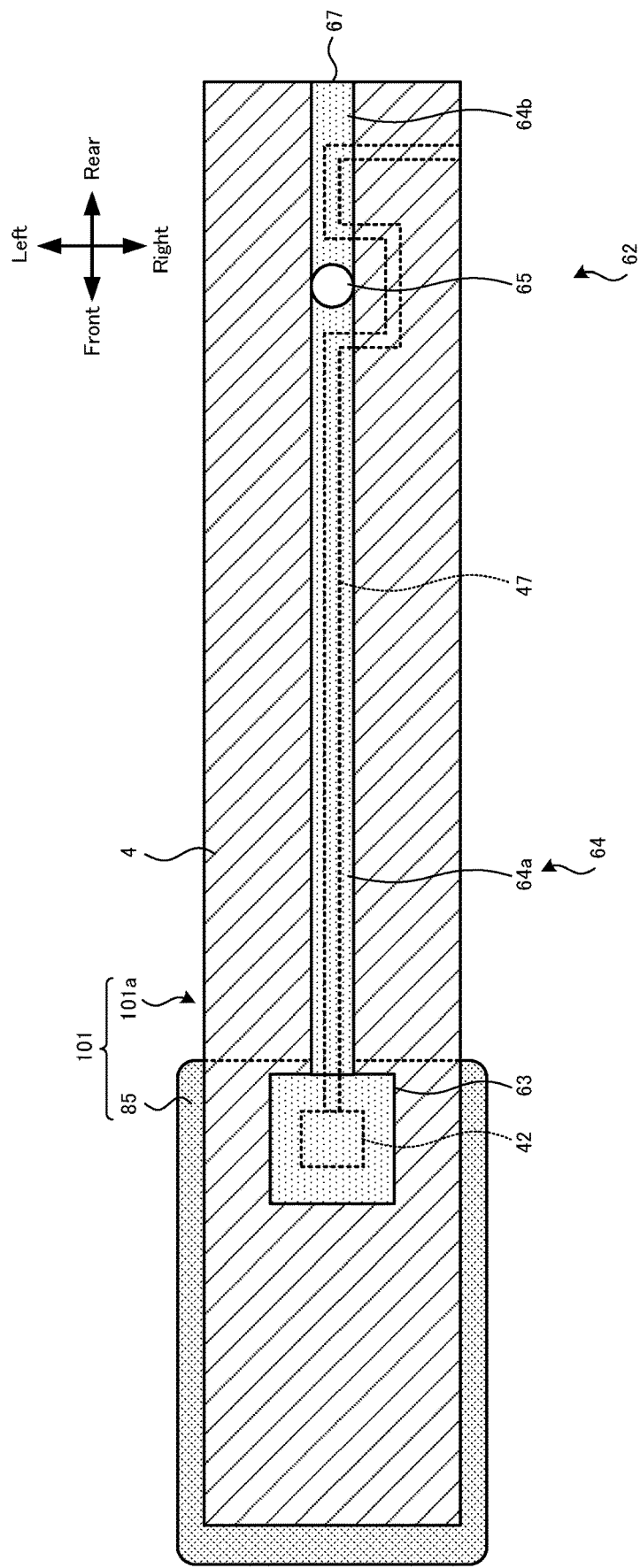
FIG. 4 is a cross-sectional view taken along line A-A in FIG. 2.
Figure 5:
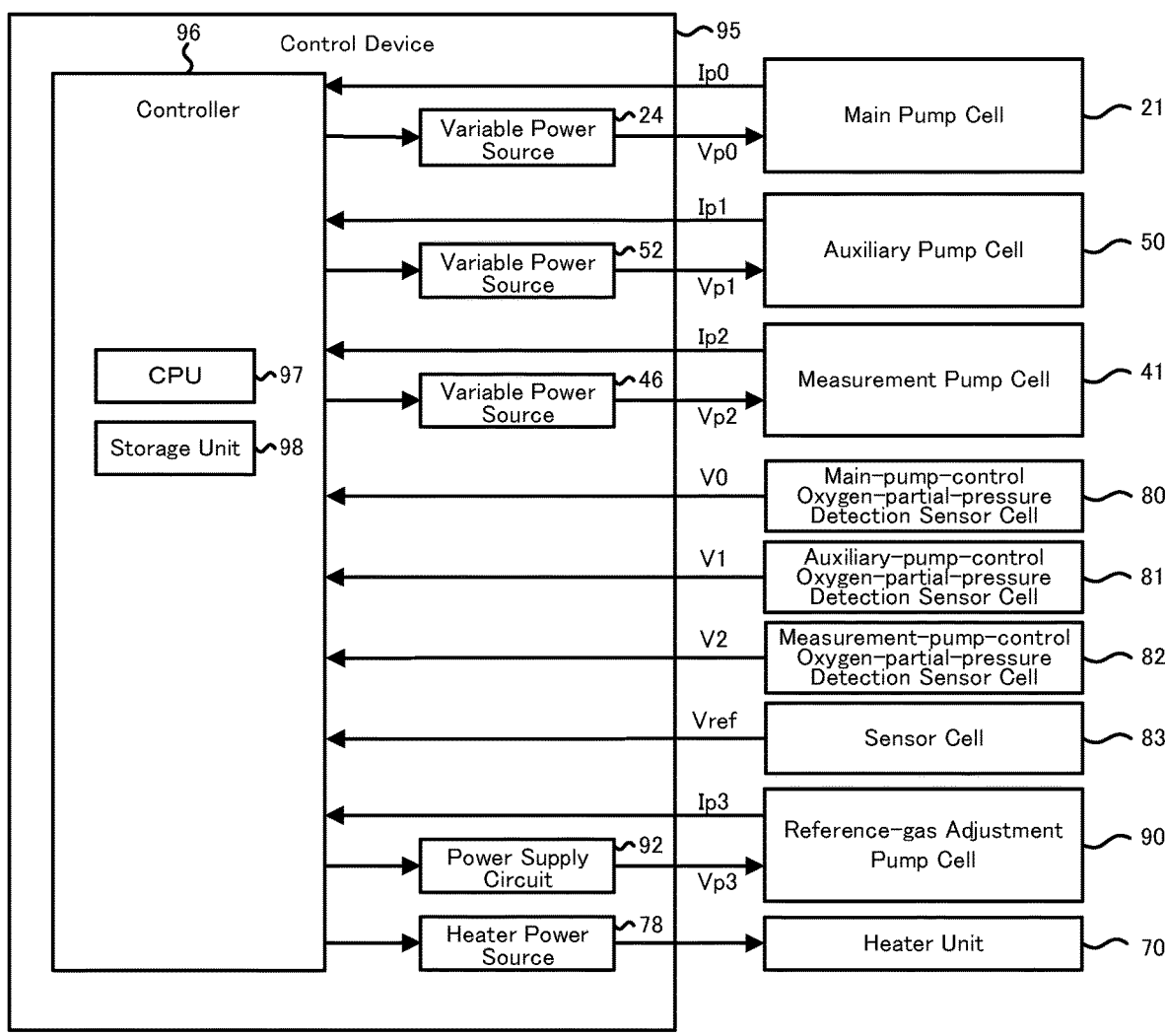
FIG. 5 is a block diagram illustrating an electrical connection relationship between a control device 95 and each cell.

Next, embodiments of the present invention will be described with reference to the drawings. FIG. 1 is a vertical sectional view of a gas sensor 100 according to an embodiment of the present invention. FIG. 2 is a schematic cross-sectional view schematically illustrating an example of the configuration of a sensor element 101 included in the gas sensor 100. FIG. 3 is a partial cross-sectional view of a preliminary chamber 65 of the sensor element 101 and the periphery thereof. FIG. 4 is a cross-sectional view taken along line A-A in FIG. 2. FIG. 5 is a block diagram illustrating an electrical connection relationship between a control device 95 and each cell.

As shown in FIG. 1, the gas sensor 100 includes the sensor element 101, a protection cover 130 that protects the front end of the sensor element 101, and a sensor assembly 140 including a connector 150 conductive with the sensor element 101. The gas sensor 100 is attached to a pipe 190, such as an exhaust gas pipe of a vehicle, as shown in FIG. 1, and is used for measuring the concentration of a specific gas, such as NOx or $O_2$, contained in exhaust gas as a measurement-object gas. In this embodiment, the gas sensor 100 measures the NOx concentration as the specific gas concentration. The sensor element 101 includes an element body 101a, and a porous protective layer 85 that covers the element body 101a. The element body 101a has an elongate rectangular parallelepiped shape. The longitudinal direction (i.e., the left-right direction in FIG. 2) of the element body 101a is defined as a front-rear direction, and the thickness direction (i.e., the up-down direction in FIG. 2) of the sensor element 101 is defined as an up-down direction. Furthermore, the width direction (i.e., a direction orthogonal to the front-rear direction and the up-down direction) of the element body 101a is defined as a left-right direction.

The protection cover 130 includes a bottomed cylindrical inner protection cover 131 that covers the front end of the sensor element 101, and a bottomed cylindrical outer protection cover 132 that covers the inner protection cover 131. The inner protection cover 131 and the outer protection cover 132 each have a plurality of holes for causing the measurement-object gas to flow into the protection cover 130. A sensor element chamber 133 is provided as a space surrounded by the inner protection cover 131, and the front end of the sensor element 101 is disposed in this sensor element chamber 133.

The sensor assembly 140 includes an element sealing unit 141 that seals and secures the sensor element 101, a bolt 147 attached to the element sealing unit 141, an outer cylinder 148, and the connector 150 that is in contact with and electrically connected to connector electrodes (only a connector electrode 69 and a heater connector electrode 71 to be described later are shown in FIG. 1 and FIG. 2) provided on surfaces (i.e., upper and lower surfaces) at the rear end of the element body 101a of the sensor element 101.

The element sealing unit 141 includes a cylindrical main fitting 142, a cylindrical inner cylinder 143 welded and secured coaxially to the main fitting 142, and ceramic supporters 144a to 144c, green compacts 145a and 145b, and a metal ring 146 that are sealed in a through-hole within the main fitting 142 and the inner cylinder 143. The sensor element 101 is located on the central axis of the element sealing unit 141 and extends through the element sealing unit 141 in the front-rear direction. The inner cylinder 143 has a reduced-diameter section 143a for pressing the green compact 145b toward the central axis of the inner cylinder 143 and a reduced-diameter section 143b for pressing the ceramic supporters 144a to 144c and the green compacts 145a and 145b forward via the metal ring 146. The green compacts 145a and 145b are compressed between the main fitting 142, the inner cylinder 143, and the sensor element 101 by the pressing forces from the reduced-diameter sections 143a and 143b, so that the green compacts 145a and 145b seal between the sensor element chamber 133 in the protection cover 130 and a space 149 in the outer cylinder 148, and also secure the sensor element 101.

The bolt 147 is secured coaxially to the main fitting 142 and has a male threaded section around the outer peripheral surface thereof. The male threaded section of the bolt 147 is inserted into a securing member 191 having a female threaded section in the inner peripheral surface thereof and welded to the pipe 190. Accordingly, the gas sensor 100 is secured to the pipe 190 in a state where the front end of the sensor element 101 and a part of the protection cover 130 of the gas sensor 100 protrude into the pipe 190.

The outer cylinder 148 covers the inner cylinder 143, the sensor element 101, and the connector 150, and a plurality of lead wires 155 connected to the connector 150 are routed outward from the rear end. The lead wires 155 are conductive with electrodes (to be described later) of the sensor element 101 via the connector 150. A gap between the outer cylinder 148 and the lead wires 155 is sealed by a rubber stopper 157. The space 149 in the outer cylinder 148 is filled with a reference gas (i.e., atmospheric gas in this embodiment). The rear end of the sensor element 101 is disposed in this space 149.

As shown in FIG. 2, the element body 101a of the sensor element 101 has a layered body obtained by stacking six layers, namely, a first substrate layer 1, a second substrate layer 2, a third substrate layer 3, a first solid electrolyte layer 4, a spacer layer 5, and a second solid electrolyte layer 6 that are formed of oxygen-ion-conductive solid electrolyte layers composed of, for example, zirconia ($ZrO_2$), in that order from below in the drawing. The solid electrolyte used for forming each of these six layers is dense and hermetic. For example, the element body 101a is manufactured by performing predetermining processing and printing of a circuit pattern on ceramic green sheets corresponding to the individual layers, subsequently stacking the sheets, and then combining the sheets by calcination.

At one end (i.e., left end in FIG. 2) of the element body 101a, a gas inlet 10, a first diffusion controlling section 11, a buffer space 12, a second diffusion controlling section 13, a first internal cavity 20, a third diffusion controlling section 30, a second internal cavity 40, a fourth diffusion controlling section 60, and a third internal cavity 61 are provided next to one another between the lower surface of the second solid electrolyte layer 6 and the upper surface of the first solid electrolyte layer 4 in a conductive manner in that order.

The gas inlet 10, the buffer space 12, the first internal cavity 20, the second internal cavity 40, and the third internal cavity 61 are spaces formed inside the element body 101a by hollowing out the spacer layer 5 and each have an upper side defined by the lower surface of the second solid electrolyte layer 6, a lower side defined by the upper surface of the first solid electrolyte layer 4, and lateral sides defined by the side surfaces of the spacer layer 5.

The first diffusion controlling section 11, the second diffusion controlling section 13, and the third diffusion controlling section 30 are each provided as two horizontally-long slits (the openings of which extend longitudinally in a direction orthogonal to the drawing). The fourth diffusion controlling section 60 is provided as a single horizontally-long slit (the opening of which extends longitudinally in the direction orthogonal to the drawing) serving as a gap with respect to the lower surface of the second solid electrolyte layer 6. A section extending from the gas inlet 10 to the third internal cavity 61 is also referred to as a measurement-object gas flow section.

The element body 101a includes a reference-gas introduction section 62 that allows the reference gas for measuring the NOx concentration to flow from the outside of the element body 101a to a reference electrode 42. The reference-gas introduction section 62 has a reference-gas chamber 63, a reference-gas flow path 64, and a preliminary chamber 65. Part of the reference-gas introduction section 62 is exposed to the rear end surface of the element body 101a, and this part functions as an entrance 67 of the reference-gas introduction section 62. The entrance 67 is exposed to the space 149 (see FIG. 1). The reference gas is introduced into the reference-gas introduction section 62 through the entrance 67. The reference-gas introduction section 62 introduces the reference gas to the reference electrode 42 while applying a predetermined diffusion resistance to the reference gas introduced through the entrance 67. In this embodiment, the reference gas is the atmospheric gas (i.e., atmosphere in the space 149 in FIG. 1). The details of the reference-gas introduction section 62 will be described later.

The reference electrode 42 is interposed between the upper surface of the third substrate layer 3 and the first solid electrolyte layer 4. Furthermore, as will be described later, the reference electrode 42 can be used for measuring the oxygen concentration (oxygen partial pressure) in the first internal cavity 20, the second internal cavity 40, and the third internal cavity 61. The reference electrode 42 is provided as a porous cermet electrode (e.g., a cermet electrode composed of Pt and $ZrO_2$).

In the measurement-object gas flow section, the gas inlet 10 is open to an external space, such that the measurement-object gas is taken into the element body 101a from the external space through the gas inlet 10. The first diffusion controlling section 11 applies a predetermined diffusion resistance to the measurement-object gas taken in through the gas inlet 10. The buffer space 12 is provided for guiding the measurement-object gas introduced by the first diffusion controlling section 11 to the second diffusion controlling section 13. The second diffusion controlling section 13 applies a predetermined diffusion resistance to the measurement-object gas introduced to the first internal cavity 20 from the buffer space 12. When the measurement-object gas is to be introduced to the first internal cavity 20 from outside the element body 101a, the measurement-object gas quickly taken into the element body 101a through the gas inlet 10 due to pressure fluctuation (i.e., pulsation of exhaust pressure if the measurement-object gas is exhaust gas of an automobile) of the measurement-object gas in the external space is not directly introduced to the first internal cavity 20 but is introduced to the first internal cavity 20 after the pressure fluctuation of the measurement-object gas is negated by traveling through the first diffusion controlling section 11, the buffer space 12, and the second diffusion controlling section 13. Accordingly, the pressure fluctuation of the measurement-object gas to be introduced to the first internal cavity 20 can be made substantially negligible. The first internal cavity 20 is provided as a space for adjusting the oxygen partial pressure in the measurement-object gas introduced via the second diffusion controlling section 13. The oxygen partial pressure is adjusted by actuating a main pump cell 21.

The main pump cell 21 is an electrochemical pump cell constituted of an inner pump electrode 22 having a ceiling electrode 22a provided substantially over the entire lower surface of the second solid electrolyte layer 6 facing the first internal cavity 20, an outer pump electrode 23 provided in a region corresponding to the ceiling electrode 22a on the upper surface of the second solid electrolyte layer 6 in a manner such that the outer pump electrode 23 is exposed to the external space (i.e., the sensor element chamber 133 in FIG. 1), and the second solid electrolyte layer 6 interposed between these electrodes.

The inner pump electrode 22 is provided astride the upper and lower solid electrolyte layers (i.e., the second solid electrolyte layer 6 and the first solid electrolyte layer 4) that define the first internal cavity 20, and the spacer layer 5 that provides sidewalls. In detail, the lower surface of the second solid electrolyte layer 6 that provides a ceiling surface for the first internal cavity 20 is provided with the ceiling electrode 22a, the upper surface of the first solid electrolyte layer 4 that provides a bottom surface is provided with a bottom electrode 22b, and side electrodes (not shown) connecting the ceiling electrode 22a and the bottom electrode 22b are provided on sidewalls (inner surfaces) of the spacer layer 5 that serve as opposite sidewalls for the first internal cavity 20, such that the inner pump electrode 22 is disposed in a tunnel-like structure in a region where the side electrodes are arranged.

The inner pump electrode 22 and the outer pump electrode 23 are provided as porous cermet electrodes (e.g., cermet electrodes composed of Pt and $ZrO_2$ and containing 1% of Au). The inner pump electrode 22 that comes into contact with the measurement-object gas is formed by using a material with a lowered reduction ability against the NOx component in the measurement-object gas.

In the main pump cell 21, a desired pump voltage Vp0 is applied between the inner pump electrode 22 and the outer pump electrode 23 so that a pump current Ip0 flows in the positive direction or the negative direction between the inner pump electrode 22 and the outer pump electrode 23, whereby the oxygen in the first internal cavity 20 can be pumped out to the external space or the oxygen in the external space can be pumped into the first internal cavity 20.

Furthermore, in order to detect the oxygen concentration (oxygen partial pressure) in the atmosphere within the first internal cavity 20, the inner pump electrode 22, the second solid electrolyte layer 6, the spacer layer 5, the first solid electrolyte layer 4, the third substrate layer 3, and the reference electrode 42 constitute an electrochemical sensor cell, that is, a main-pump-control oxygen-partial-pressure detection sensor cell 80.

The oxygen concentration (oxygen partial pressure) in the first internal cavity 20 can be determined by measuring an electromotive force (voltage V0) in the main-pump-control oxygen-partial-pressure detection sensor cell 80. Furthermore, feedback control is performed on the pump voltage Vp0 of a variable power source 24 so that the voltage V0 becomes a target value, whereby the pump current Ip0 is controlled. Accordingly, the oxygen concentration in the first internal cavity 20 can be maintained at a predetermined fixed value.

The third diffusion controlling section 30 applies a predetermined diffusion resistance to the measurement-object gas, the oxygen concentration (oxygen partial pressure) of which has been controlled in the first internal cavity 20 in accordance with the operation of the main pump cell 21, and guides the measurement-object gas to the second internal cavity 40.

The second internal cavity 40 is provided as a space where an auxiliary pump cell 50 further adjusts the oxygen partial pressure of the measurement-object gas that has preliminarily undergone oxygen concentration (oxygen partial pressure) adjustment in the first internal cavity 20 and that has subsequently been introduced via the third diffusion controlling section 30. Accordingly, the oxygen concentration in the second internal cavity 40 can be maintained at a fixed level with high accuracy, thereby allowing for highly-accurate NOx concentration measurement in the gas sensor 100.

The auxiliary pump cell 50 is an auxiliary electrochemical pump cell constituted of an auxiliary pump electrode 51 having a ceiling electrode 51a provided substantially over the entire lower surface of the second solid electrolyte layer 6 facing the second internal cavity 40, the outer pump electrode 23 (but not limited to the outer pump electrode 23 and may possibly be an appropriate electrode at the outer side of the element body 101a), and the second solid electrolyte layer 6.

The auxiliary pump electrode 51 is disposed within the second internal cavity 40 in a tunnel-like structure similar to the aforementioned inner pump electrode 22 provided in the first internal cavity 20. Specifically, the tunnel-like structure is provided such that the second solid electrolyte layer 6 that provides a ceiling surface for the second internal cavity 40 is provided with the ceiling electrode 51a, the first solid electrolyte layer 4 that provides a bottom surface for the second internal cavity 40 is provided with a bottom electrode 51b, and side electrodes (not shown) that connect the ceiling electrode 51a and the bottom electrode 51b are provided on opposite wall surfaces of the spacer layer 5 that provide sidewalls for the second internal cavity 40. The auxiliary pump electrode 51 is similar to the inner pump electrode 22 in being formed by using a material with a lowered reduction ability against the NOx component in the measurement-object gas.

In the auxiliary pump cell 50, a desired voltage Vp1 is applied between the auxiliary pump electrode 51 and the outer pump electrode 23 so that the oxygen in the atmosphere within the second internal cavity 40 can be pumped out to the external space or the oxygen can be pumped into the second internal cavity 40 from the external space.

Furthermore, in order to control the oxygen partial pressure in the atmosphere within the second internal cavity 40, the auxiliary pump electrode 51, the reference electrode 42, the second solid electrolyte layer 6, the spacer layer 5, the first solid electrolyte layer 4, and the third substrate layer 3 constitute an electrochemical sensor cell, that is, an auxiliary-pump-control oxygen-partial-pressure detection sensor cell 81.

The auxiliary pump cell 50 performs pumping in accordance with a variable power source 52 that is voltage-controlled based on an electromotive force (voltage V1) detected by the auxiliary-pump-control oxygen-partial-pressure detection sensor cell 81. Accordingly, the oxygen partial pressure in the atmosphere within the second internal cavity 40 is controlled to a low partial pressure that substantially has no effect on NOx measurement.

In addition, a pump current Ip1 is used for controlling the electromotive force of the main-pump-control oxygen-partial-pressure detection sensor cell 80. In detail, the pump current Ip1 is input as a control signal to the main-pump-control oxygen-partial-pressure detection sensor cell 80, and the voltage V0 is controlled to the aforementioned target value, whereby the gradient of the oxygen partial pressure in the measurement-object gas introduced to the second internal cavity 40 from the third diffusion controlling section 30 is controlled such that the gradient is constantly fixed. When the gas sensor 100 is used as a NOx sensor, the oxygen concentration within the second internal cavity 40 is maintained at a fixed value of about 0.001 ppm in accordance with the functions of the main pump cell 21 and the auxiliary pump cell 50.

The fourth diffusion controlling section 60 applies a predetermined diffusion resistance to the measurement-object gas, the oxygen concentration (oxygen partial pressure) of which has been controlled in the second internal cavity 40 in accordance with the operation of the auxiliary pump cell 50, and guides the measurement-object gas to the third internal cavity 61. The fourth diffusion controlling section 60 has a role of limiting the amount of NOx flowing into the third internal cavity 61.

The third internal cavity 61 is provided as a space where a process for measuring the nitrogen oxide (NOx) concentration in the measurement-object gas is performed on the measurement-object gas that has preliminarily undergone oxygen concentration (oxygen partial pressure) adjustment in the second internal cavity 40 and that has subsequently been introduced via the fourth diffusion controlling section 60. The NOx concentration is measured mainly in the third internal cavity 61 in accordance with the operation of a measurement pump cell 41.

The measurement pump cell 41 measures the NOx concentration in the measurement-object gas within the third internal cavity 61. The measurement pump cell 41 is an electrochemical pump cell constituted of a measurement electrode 44 provided on the upper surface of the first solid electrolyte layer 4 facing the third internal cavity 61, the outer pump electrode 23, the second solid electrolyte layer 6, the spacer layer 5, and the first solid electrolyte layer 4. The measurement electrode 44 is a porous cermet electrode composed of a material with a higher reduction ability against the NOx component in the measurement-object gas than the inner pump electrode 22. The measurement electrode 44 also functions as a NOx reduction catalyst that reduces the NOx existing in the atmosphere within the third internal cavity 61.

In the measurement pump cell 41, oxygen produced as a result of decomposition of the nitrogen oxide in the atmosphere surrounding the measurement electrode 44 is pumped out, and the amount of oxygen produced can be detected as a pump current Ip2.

Furthermore, in order to detect the oxygen partial pressure around the measurement electrode 44, the first solid electrolyte layer 4, the third substrate layer 3, the measurement electrode 44, and the reference electrode 42 constitute an electrochemical sensor cell, that is, a measurement-pump-control oxygen-partial-pressure detection sensor cell 82. A variable power source 46 is controlled based on an electromotive force (voltage V2) detected by the measurement-pump-control oxygen-partial-pressure detection sensor cell 82.

The measurement-object gas introduced to the second internal cavity 40 reaches the measurement electrode 44 in the third internal cavity 61 via the fourth diffusion controlling section 60 under a condition where the oxygen partial pressure is controlled. The nitrogen oxide in the measurement-object gas surrounding the measurement electrode 44 is reduced ($2NO \rightarrow N_2 + O_2$), so that oxygen is produced. Then, the produced oxygen is to undergo pumping by the measurement pump cell 41. During the pumping of the oxygen, a voltage Vp2 of the variable power source 46 is controlled such that the voltage V2 detected by the measurement-pump-control oxygen-partial-pressure detection sensor cell 82 is a fixed value (i.e., a target value). Because the amount of oxygen produced around the measurement electrode 44 is proportional to the concentration of the nitrogen oxide in the measurement-object gas, the nitrogen oxide concentration in the measurement-object gas is calculated by using the pump current Ip2 in the measurement pump cell 41.

Furthermore, the second solid electrolyte layer 6, the spacer layer 5, the first solid electrolyte layer 4, the third substrate layer 3, the outer pump electrode 23, and the reference electrode 42 constitute an electrochemical sensor cell 83. The oxygen partial pressure in the measurement-object gas outside the sensor can be detected in accordance with an electromotive force (voltage Vref) obtained by the sensor cell 83.

Moreover, the second solid electrolyte layer 6, the spacer layer 5, the first solid electrolyte layer 4, the third substrate layer 3, the outer pump electrode 23, and the reference electrode 42 constitute an electrochemical reference-gas adjustment pump cell 90. The reference-gas adjustment pump cell 90 performs oxygen pumping by receiving a control current (i.e., an oxygen pump current) Ip3 flowing in accordance with a control voltage Vp3 applied by a power supply circuit 92 connected between the outer pump electrode 23 and the reference electrode 42. Accordingly, the reference-gas adjustment pump cell 90 pumps in oxygen around the reference electrode 42 from the space (i.e., the sensor element chamber 133 in FIG. 1) surrounding the outer pump electrode 23.

In the gas sensor 100 having the above configuration, the measurement pump cell 41 receives the measurement-object gas whose oxygen partial pressure is constantly maintained at a fixed low value (i.e., a value that substantially has no effect on NOx measurement) as a result of actuation of the main pump cell 21 and the auxiliary pump cell 50. Thus, the NOx concentration in the measurement-object gas can be ascertained based on the pump current Ip2 flowing as a result of oxygen produced by NOx reduction being pumped out by the measurement pump cell 41 substantially in proportion to the NOx concentration in the measurement-object gas.

Furthermore, in order to enhance oxygen ion conductivity of the solid electrolyte, the element body 101a includes a heater unit 70 having a role of temperature adjustment for keeping the element body 101a warm by heating the element body 101a. The heater unit 70 includes a heater connector electrode 71, a heater 72, a through-hole 73, a heater insulation layer 74, and a lead wire 76.

The heater connector electrode 71 is provided in contact with the lower surface of the first substrate layer 1. By being connected to an external power source, the heater connector electrode 71 can supply electricity to the heater unit 70 from the outside.

The heater 72 is an electrical resistor interposed between the second substrate layer 2 and the third substrate layer 3 from above and below. The heater 72 is connected to the heater connector electrode 71 via the lead wire 76 and the through-hole 73, and generates heat by being supplied with electricity from the outside via the heater connector electrode 71, thereby heating and maintaining the temperature of the solid electrolyte constituting the element body 101a.

Furthermore, the heater 72 is embedded in the entire region from the first internal cavity 20 to the third internal cavity 61, and is capable of adjusting the entire element body 101a to a temperature at which the aforementioned solid electrolyte is activated.

The heater insulation layer 74 is a porous-alumina insulation layer provided on the upper and lower surfaces of the heater 72 and formed of an insulator composed of, for example, alumina. The heater insulation layer 74 is provided for the purpose of obtaining electrical insulation between the second substrate layer 2 and the heater 72, as well as electrical insulation between the third substrate layer 3 and the heater 72.

The porous protective layer 85 covers the front-end surface and the upper, lower, right, and left surfaces of the element body 101a. The porous protective layer 85 covers only the front end and the region near the front end of the element body 101a. Thus, the porous protective layer 85 covers the peripheral areas of the electrodes 22, 23, 51, 44, 42 of the element body 101a, used to detect the specific gas concentration, in other words, covers a portion of the element body 101a, the portion being exposed to the measurement-object gas in the sensor element chamber 133. In addition, the porous protective layer 85 is provided in a range of the element body 101a, to the rear end of the measurement-object gas flow section and to a rear position of the rear end of the reference-gas chamber 63. In other words, when the element body 101a is viewed perpendicular to the longitudinal direction (e.g., when the element body 101a is viewed from above), the measurement-object gas flow section and the reference-gas chamber 63 are located to be included in the porous protective layer 85. The porous protective layer 85 plays a role to prevent cracking from occurring in the element body 101a due to adherence of water in the measurement-object gas thereto.

The porous protective layer 85 is composed of a ceramic porous body, such as an alumina porous body, a zirconia porous body, a spinel porous body, a cordierite porous body, a titania porous body, and a magnesia porous body. In this embodiment, the porous protective layer 85 is composed of an alumina porous body.

As shown in FIG. 5, the control device 95 includes the aforementioned variable power sources 24, 46, and 52, a heater power source 78, the aforementioned power supply circuit 92, and a controller 96. The controller 96 is a microprocessor including a CPU 97, a RAM (not shown), and a storage unit 98. The storage unit 98 is a nonvolatile memory, such as a ROM, and stores various types of data. The controller 96 receives the voltages V0 to V2 and the voltage Vref from the sensor cells 80 to 83. The controller 96 receives the pump currents Ip0 to Ip2 and the pump current Ip3 flowing through the pump cells 21, 50, 41, and 90. The controller 96 outputs control signals to the variable power sources 24, 46, and 52 and the power supply circuit 92 so as to control the voltages Vp0 to Vp3 output by the variable power sources 24, 46, and 52 and the power supply circuit 92, thereby controlling the pump cells 21, 41, 50, and 90. The controller 96 outputs a control signal to the heater power source 78 so as to control the electric power supplied to the heater 72 by the heater power source 78, thereby adjusting the temperature of the sensor element 101. The storage unit 98 stores therein, for example, target values V0*, V1*, V2*, Ip1* to be described below.

The controller 96 performs feedback control on the pump voltage Vp0 of the variable power source 24 so as to set the voltage V0 to the target value V0* (i.e., to set the oxygen concentration in the first internal cavity 20 to a target concentration).

The controller 96 performs feedback control on the voltage Vp1 of the variable power source 52 so as to set the voltage V1 to a fixed value (referred to as "target value V1*") (i.e., to set the oxygen concentration in the second internal cavity 40 to a predetermined low oxygen concentration that substantially has no effect on NOx measurement). In addition, the controller 96 sets (i.e., performs feedback control on) the target value V0* of the voltage V0 based on the pump current Ip1 so as to set the pump current Ip1 flowing in accordance with the voltage Vp1 to a fixed value (referred to as "target value Ip1*"). Accordingly, the gradient of the oxygen partial pressure in the measurement-object gas introduced to the second internal cavity 40 from the third diffusion controlling section 30 is constantly fixed. Moreover, the oxygen partial pressure in the atmosphere within the second internal cavity 40 is controlled to a low partial pressure that substantially has no effect on NOx measurement. The target value V0* is set to a value at which the oxygen concentration in the first internal cavity 20 is higher than 0% and is a low oxygen concentration.

The controller 96 performs feedback control on the voltage Vp2 of the variable power source 46 so as to set the voltage V2 to a fixed value (referred to as "target value V2*") (i.e., to set the oxygen concentration in the third internal cavity 61 to a predetermined low concentration). Thus, oxygen produced as a result of a specific gas (in this case, NOx) in the measurement-object gas being reduced in the third internal cavity 61 is pumped out from the third internal cavity 61 such that the oxygen becomes substantially zero. Then, the controller 96 acquires the pump current Ip2 as a detection value according to the oxygen produced in the third internal cavity 61 from NOx, and calculates the NOx concentration in the measurement-object gas based on the pump current Ip2. The target value V2* is preliminarily set as a value at which the pump current Ip2 flowing in accordance with the feedback-controlled voltage Vp2 serves as a limiting current. The storage unit 98 stores therein, for example, a relational expression (e.g., a linear function expression) or a map as a correspondence relationship between the pump current Ip2 and the NOx concentration. Such a relational expression or a map can be preliminarily obtained from tests. Then, the controller 96 detects the NOx concentration in the measurement-object gas based on the acquired pump current Ip2 and the aforementioned correspondence relationship stored in the storage unit 98.

The controller 96 controls the power supply circuit 92 to apply the control voltage Vp3 to the reference-gas adjustment pump cell 90, thereby causing the pump current Ip3 to flow. In this embodiment, the control voltage Vp3 is set to a direct-current voltage at which the pump current Ip3 is a predetermined value (i.e., a fixed direct-current value). Therefore, by causing the pump current Ip3 to flow, the reference-gas adjustment pump cell 90 pumps in a specific amount of oxygen from the periphery of the outer pump electrode 23 to the periphery of the reference electrode 42.

The control device 95, including the variable power sources 24, 46, and 52 and the power supply circuit 92 shown in FIG. 2, is actually connected to the electrodes in the element body 101a via lead wires (only a reference electrode lead 47 to be described later is shown in FIG. 4) which are not shown and provided in the element body 101a, the connector 150, and the lead wires 155 shown in FIG. 1.

The reference-gas introduction section 62 and the surrounding configuration thereof will be described in detail with reference to FIGS. 2 to 4. As mentioned above, the reference-gas introduction section 62 includes the reference-gas chamber 63, the reference-gas flow path 64 and the preliminary chamber 65. The reference-gas flow path 64 includes a reference-gas flow path 64a which is a flow path for the reference gas between the reference-gas chamber 63 and the preliminary chamber 65, and a reference-gas flow path 64b which is a flow path for the reference gas between the preliminary chamber 65 and the outside of the element body 101a. The reference-gas chamber 63 and the reference-gas flow path 64 are provided between the upper surface of the third substrate layer 3 and the lower surface of the first solid electrolyte layer 4. The reference electrode 42 is disposed in the reference-gas chamber 63. In this embodiment, the reference-gas chamber 63 is filled with a porous body, which covers the reference electrode 42. In this embodiment, the reference-gas flow path 64a and the reference-gas flow path 64b are also composed of a porous body. The porous body of which the reference-gas chamber 63 and the reference-gas flow path 64 are composed, is a porous body composed of ceramics such as alumina. Part (in this case, the rear end) of the reference-gas flow path 64b is exposed to the surface (in this case, the rear end surface) of the element body 101a, and this part functions as the entrance 67 mentioned above.

The preliminary chamber 65 is a space formed in the element body 101a. In this embodiment, as shown in FIGS. 2 to 4, the preliminary chamber 65 is a cylindrical space which is formed as a hole vertically through the first solid electrolyte layer 4. The preliminary chamber 65 is disposed in the middle of the reference-gas flow path 64. In this embodiment, the preliminary chamber 65 is disposed so as to intrude the reference-gas flow path 64, specifically disposed between the reference-gas flow path 64a and the reference-gas flow path 64b. Thus, the reference-gas flow path 64 is divided into the reference-gas flow path 64a and the reference-gas flow path 64b forward and rearward of the preliminary chamber 65. Therefore, when the reference gas flows between the entrance 67 and the reference electrode 42, the reference gas necessarily passes through the preliminary chamber 65 between the reference-gas flow path 64a and the reference-gas flow path 64b. The reference gas introduced through the entrance 67 to the inside of the reference-gas introduction section 62 passes through the reference-gas flow path 64b, the preliminary chamber 65, the reference-gas flow path 64a, and the reference-gas chamber 63 in that order, and reaches the reference electrode 42.

At least part of the reference-gas flow path 64 is composed of a porous body so that the preliminary chamber 65 does not directly communicate with the outside of the element body 101a. In this embodiment, the reference-gas flow path 64b, which is the portion of the reference-gas flow path 64 between the preliminary chamber 65 and the outside of the element body 101a, is overall composed of a porous body, thus the preliminary chamber 65 does not directly communicate with the outside of the element body 101a. The preliminary chamber 65 is surrounded by the lower surface of the spacer layer 5, the upper surface of the third substrate layer 3, and the lateral surfaces of the first solid electrolyte layer 4 (see FIG. 2, FIG. 3), there is no reference-gas flow path which communicates with the outside without passing through the reference-gas flow path 64b.

The reference-gas chamber 63 and the preliminary chamber 65 each have a diffusion resistance lower than that of the reference-gas flow path 64. In this embodiment, the reference-gas chamber 63 and the reference-gas flow path 64 are layers with the same predetermined thickness (in this case, a predetermined length in the up-down direction), in which a cross section taken along a plane perpendicular to the longitudinal direction of the element body 101a is rectangular. The reference-gas chamber 63 and the reference-gas flow path 64 (64a, 64b) are both rectangular in plan view, that is, when viewed from above. As shown in FIG. 4, the width (in this case, a length in the left-right direction) of the reference-gas chamber 63 is greater than the width of the reference-gas flow path 64. Thus, the reference-gas chamber 63 and the reference-gas flow path 64 have the same thickness, and the reference-gas chamber 63 has a greater width, thus the reference-gas chamber 63 has a larger flow path cross section (the area of a section perpendicular to the flow direction of the reference gas). Furthermore, the reference-gas chamber 63 and the reference-gas flow path 64 are entirely composed of the same porous material, thus have the same porosity. Consequently, the reference-gas chamber 63 has a lower diffusion resistance than that of the reference-gas flow path 64. As shown in FIG. 4, the preliminary chamber 65 has the same width as the reference-gas flow path 64, but has a greater thickness (height) than the reference-gas flow path 64, thus the flow path cross section of the preliminary chamber 65 is larger than the flow path cross section of the reference-gas flow path 64. Furthermore, the preliminary chamber 65 is not filled with a porous body, and is a space. Consequently, the preliminary chamber 65 has a lower diffusion resistance than that of the reference-gas flow path 64.

Note that the diffusion resistance of each of the reference-gas chamber 63, the reference-gas flow path 64, and the preliminary chamber 65 is a diffusion resistance per unit length along the reference-gas flow direction (in this case, the front-rear direction). For example, the diffusion resistance of the preliminary chamber 65 can be calculated by dividing the length (the unit is cm, for example) of the preliminary chamber 65 in the reference-gas flow direction (in this case, the front-rear direction) by the volume (the unit is $cm^3$, for example) of the preliminary chamber 65. In other words, the diffusion resistance of the preliminary chamber 65 is the reciprocal (1/average cross-sectional area) of an average cross-sectional area of a section perpendicular to the reference-gas flow direction. When the preliminary chamber 65 is filled with a porous body as in the reference-gas chamber 63 and the reference-gas flow path 64, the diffusion resistance can be calculated by further dividing the value, which is the quotient of the above-mentioned length by the volume, by the porosity of the porous body. In other words, the diffusion resistance of the reference-gas chamber 63 and the reference-gas flow path 64 is the reciprocal (=1/(average cross-sectional area×porosity)) of (average cross-sectional area×porosity). Even when the value itself of the diffusion resistance cannot be calculated accurately, it is sufficient that a magnitude relationship between the diffusion resistances of the reference-gas chamber 63, the preliminary chamber 65, and the reference-gas flow path 64 be compared with each other. For example, when the reference-gas chamber 63 and the reference-gas flow path 64 are composed of the same porous material as mentioned above, it is seen that a larger average cross-sectional area indicates a lower diffusion resistance regardless of the consideration of porosity. Since the preliminary chamber 65 is not a porous body but a space, when the average cross-sectional area of the preliminary chamber 65 is at least greater than or equal to the average cross-sectional area of the reference-gas flow path 64, it is seen that the preliminary chamber 65 has a lower diffusion resistance regardless of the consideration of the porosity of the reference-gas flow path 64.

The thicknesses of the reference-gas chamber 63 and the reference-gas flow path 64 are not particularly restricted, and may be set as appropriate in a range of 10 to 30 µm, for example. The porosity of the porous body of which the reference-gas chamber 63 and the reference-gas flow path 64 are composed, is not particularly restricted, and may be set as appropriate in a range of 10 to 50%, for example. The reference-gas chamber 63 and the reference-gas flow path 64 may be different in at least one of material, porosity and thickness.

The capacity ratio (=the capacity of the preliminary chamber 65/the capacity of the reference-gas chamber 63) of the capacity of the preliminary chamber 65 to the capacity of the reference-gas chamber 63 is preferably 1.5 times or greater and 30 times or less. "The capacity" is the volume of a spatial portion. Thus, for the reference-gas chamber 63 composed of a porous body, the capacity of the reference-gas chamber 63 is the product of the volume based on the shape of the reference-gas chamber 63 and the porosity of the reference-gas chamber 63. In this embodiment, for the preliminary chamber 65, the reference-gas chamber 63 is not filled with a porous body, and is a space entirely, thus the volume based on the shape of the preliminary chamber 65 itself is the capacity of the preliminary chamber 65. The capacity ratio may be less than or equal to 8 times, or may be less than or equal to 4 times. The volume of the reference-gas chamber 63 may be greater than or equal to 0.01 mm$^3$, or may be greater than or equal to 0.02 mm$^3$. The volume of the reference-gas chamber 63 may be less than or equal to 0.05 mm$^3$, or may be less than or equal to 0.04 mm$^3$.

The porosity of the reference-gas chamber 63 is a value derived as follows by using an image (SEM image) obtained from observation using a scanning electron microscope (SEM). First, the sensor element 101 is cut such that a cross section of the reference-gas chamber 63 is set as an observation surface, and an observation sample is obtained by performing a resin-embedding process and a polishing process on the cut surface. Then, the observation surface of the observation sample is photographed by SEM photography (with a secondary electron image, an acceleration voltage of 15 kV, and a magnifying power of 1000, but a magnifying power higher than 1000 and 5000 or lower if the magnifying power of 1000 is inappropriate), whereby an SEM image of the reference-gas chamber 63 is obtained. Subsequently, the obtained image is analyzed, so that a threshold value is determined using the discriminant analysis method (Otsu binarization method) from a brightness distribution of brightness data of the pixels in the image. Then, each pixel in the image is binarized into an object section and a pore section based on the determined threshold value, and the area of the object section and the area of the pore section are calculated. Then, the percentage of the area of the pore section relative to the overall area (i.e., the total area of the object section and the pore section) is derived as the porosity P [%]. The porosity the reference-gas flow path 64 can also be derived by a similar method. When the preliminary chamber 65 is filled with a porous body, the porosity of the preliminary chamber 65 can also be derived by a similar method.

The reference electrode 42 is electrically connected to the reference electrode lead 47. The reference electrode lead 47 is not illustrated in FIG. 2, but is illustrated with a dashed line in FIG. 4. The reference electrode lead 47 extends leftward from the right-side surface of the element body 101*a*, descends below the reference-gas flow path 64*b*, bends forward therefrom to extend in the longitudinal direction of the reference-gas flow path 64, and then reaches the reference electrode 42. However, as shown in FIG. 4, in mid-course, the reference electrode lead 47 is wired to bypass the preliminary chamber 65. The reference electrode lead 47 is connected to the connector electrode 69 (or a connector electrode (not shown) disposed at the lower surface of the element body 101*a*) disposed at the upper surface of the element body 101*a*. By using the reference electrode lead 47 and the connector electrode 69, electricity can be supplied to the reference electrode 42 from the outside, or the voltage and the current of the reference electrode 42 can be externally measured. The reference electrode lead 47 is composed of a material having conductivity, and the main component may be noble metal, for example. In this embodiment, the noble metal contained in the reference electrode lead 47 is Pt.

Next, an example of a method for manufacturing the gas sensor 100 will be described below. First, six non-calcinated ceramic green sheets each containing an oxygen-ion-conductive solid electrolyte, such as zirconia, as a ceramic component are prepared. In each of these green sheets, a plurality of sheet holes used for positioning during printing or stacking as well as necessary through-holes are formed in advance. Furthermore, the green sheet that is to become the spacer layer 5 preliminarily undergoes a punching process so as to be provided with a space that is to become the measurement-object gas flow section. The green sheet that is to become the first solid electrolyte layer 4 preliminarily undergoes a punching process so as to be provided with a space (hole) that is to become the preliminary chamber 65. Then, a pattern-printing process and a drying process for forming various patterns in the ceramic green sheets are performed in correspondence with the first substrate layer 1, the second substrate layer 2, the third substrate layer 3, the first solid electrolyte layer 4, the spacer layer 5, and the second solid electrolyte layer 6. In detail, the patterns to be formed are patterns of, for example, the aforementioned electrodes, the lead wires to be connected to the electrodes, the reference-gas chamber 63, the reference-gas flow path 64, and the heater unit 70. The pattern-printing process is performed by applying a pattern-forming paste prepared in accordance with the properties required in an object to be formed onto a green sheet by using a known screen printing technique. A known drying technique is also used for the drying process. When the pattern printing process and the drying process are completed, an adhesive paste for stacking and adhering together the green sheets corresponding to the respective layers is printed and dried. Then, the green sheets provided with the adhesive paste are stacked in a predetermined order while being positioned using the sheet holes, and then undergo a pressure bonding process by receiving a predetermined temperature and a predetermined pressure, thereby becoming a single layered body. The layered body obtained in this manner contains a plurality of element bodies 101*a* therein. The layered body is cut so as to be divided into element bodies 101*a* of a given size. Then, each divided piece of the layered body is calcinated at a predetermined calcination temperature so that an element body 101*a* is obtained. When the plurality of green sheets are to be stacked, the portion that is to become the measurement-object gas flow section and the portion that is to become the space (in this case, the preliminary chamber 65) of the reference-gas introduction section 62 are preferably filled with a paste composed of a disappearing material (e.g., theobromine) that disappears during the calcination process. Subsequently, the porous protective layer 85 is formed in the element body 101*a* by plasma spray coating, then the sensor element 101 is obtained. In addition to the plasma spray coating, screen printing, mold cast method, and dipping may be used as a method for manufacturing the porous protective layer 85.

When the sensor element 101 is obtained in this manner, the sensor assembly 140 (see FIG. 1) having the sensor element 101 integrated therein is fabricated, and the protection cover 130 and the rubber stopper 157 are attached thereto. Then, the control device 95 and the sensor element 101 are connected by the lead wires 155, so that the gas sensor 100 is obtained.

Note that the diffusion resistances of the reference-gas chamber 63 and the reference-gas flow path 64 can be adjusted by adjusting the shape of each of the reference-gas chamber 63 and the reference-gas flow path 64, and the porosity thereof. For example, these shapes can be adjusted by adjusting the patterns at the time of forming the porous body of which each of the reference-gas chamber 63 and the reference-gas flow path 64 is composed. Furthermore, the porosity can be adjusted by adjusting the particle diameter of the ceramic particles contained in the pattern-forming paste of the porous body of each of the reference-gas chamber 63 and the reference-gas flow path 64 or by adjusting the particle diameter or the mixture ratio of a pore-forming material. As a pore-forming material, for example, an organic polymer and theobromine can be used. The diffusion resistance of the preliminary chamber 65 can be adjusted by adjusting, for example, the shape of the preliminary chamber 65. The shape of the preliminary chamber 65 can be adjusted by adjusting, for example, the shape of a punching hole (e.g., the diameter of a hole) formed in the green sheet that is to become the first solid electrolyte layer 4.

A process performed by the controller 96 when the gas sensor 100 detects the NOx concentration in the measurement-object gas will now be described. First, the CPU 97 of the controller 96 starts to drive the sensor element 101. In detail, the CPU 97 transmits a control signal to the heater power source 78 so as to heat the sensor element 101 by using the heater 72. Then, the CPU 97 heats the sensor element 101 to a predetermined driving temperature (e.g., 800° C.). Subsequently, the CPU 97 starts to control the aforementioned pump cells 21, 41, 50, and 90 and to acquire the voltages V0, V1, V2, and Vref from the aforementioned sensor cells 80 to 83. When the measurement-object gas is introduced through the gas inlet 10 in this state, the measurement-object gas travels through the first diffusion controlling section 11, the buffer space 12, and the second diffusion controlling section 13 so as to reach the first internal cavity 20. Then, the oxygen concentration of the measurement-object gas in the first internal cavity 20 and the second internal cavity 40 is adjusted by the main pump cell 21 and the auxiliary pump cell 50, and the measurement-object gas having undergone the adjustment reaches the third internal cavity 61. Subsequently, the CPU 97 detects the NOx concentration in the measurement-object gas based on the acquired pump current Ip2 and the correspondence relationship stored in the storage unit 98.

In the sensor element 101, the measurement-object gas flow section, such as the gas inlet 10, introduces the measurement-object gas from the sensor element chamber 133 shown in FIG. 1. On the other hand, the reference-gas introduction section 62 in the sensor element 101 introduces the reference gas (atmospheric gas) in the space 149 shown in FIG. 1. The sensor element chamber 133 and the space 149 are defined by the sensor assembly 140 (i.e., the green compacts 145*a* and 145*b*), and are sealed so that the gas does not flow therebetween. However, for example, in a case where the pressure of the measurement-object gas is high, the measurement-object gas slightly enters the space 149, sometimes causing the oxygen concentration in the space 149 to decrease. In this case, if the oxygen concentration around the reference electrode 42 also decreases, the reference potential serving as the potential of the reference electrode 42 changes. This may cause a change in, for example, a voltage based on the reference electrode 42, such as the voltage V2 of the measurement-pump-control oxygen-partial-pressure detection sensor cell 82 during the driving of the sensor element 101, thus resulting in reduced detection accuracy for the NOx concentration in the measurement-object gas. In contrast, in the sensor element 101 of this embodiment, the preliminary chamber 65 having a diffusion resistance lower than that of the reference-gas flow path 64 is provided between the reference-gas flow path 64*a* and the reference-gas flow path 64*b* of the reference-gas introduction section 62. Since the reference-gas flow path 64*b* is composed of a porous body, the preliminary chamber 65 does not directly communicate with the outside of the element body 101*a*. Consequently, the preliminary chamber 65 plays a role as a buffer against change in the oxygen concentration in the reference gas, thus decrease in the oxygen concentration around the reference electrode 42 is reduced.

In this embodiment, during the driving of the sensor element 101, the controller 96 uses the reference-gas adjustment pump cell 90 to pump in oxygen from the periphery of the outer pump electrode 23 to the periphery of the reference electrode 42, as mentioned above. Accordingly, when the oxygen concentration around the reference electrode 42 decreases, the reduced oxygen can be compensated for, thereby reducing a decrease in the detection accuracy for the NOx concentration. However, depending on the degree of a decrease in the oxygen concentration of the reference gas surrounding the sensor element 101, the oxygen concentration around the reference electrode 42 may sometimes decrease even if oxygen is pumped in toward the periphery of the reference electrode 42 by the reference-gas adjustment pump cell 90. The oxygen concentration around the reference electrode 42 may sometimes increase due to a large amount of oxygen pumped in the periphery of the reference electrode 42 by the reference-gas adjustment pump cell 90. Thus, when oxygen is pumped in by the reference-gas adjustment pump cell 90, the oxygen concentration around the reference electrode 42 may also sometimes change (increase or decrease). To cope with this, in the sensor element 101 of this embodiment, the preliminary chamber 65 plays a role as a buffer against the change in the oxygen concentration in the reference gas, thus the change in the oxygen concentration around the reference electrode 42 can be reduced. Therefore, regardless of whether oxygen is pumped in by the reference-gas adjustment pump cell 90, due to the presence of the preliminary chamber 65, the change in the oxygen concentration around the reference electrode 42 can be reduced. As a result, change in the reference potential can be reduced, and decrease in the detection accuracy for the NOx concentration in the measurement-object gas can be reduced.

The correspondence relationship between the components in this embodiment and the components in the present invention will now be clarified. The element body 101a according to this embodiment correspond to an element body according to the present invention, the reference electrode 42 corresponds to a reference electrode, the reference-gas introduction section 62 corresponds to a reference-gas introduction section, the reference-gas flow path 64 corresponds to a reference-gas flow path, and the preliminary chamber 65 corresponds to a preliminary chamber. In addition, the reference-gas chamber 63 corresponds to a reference-gas chamber.

In the gas sensor 100 according to this embodiment described in detail above, in the sensor element 101, the preliminary chamber 65 having a diffusion resistance lower than that of the reference-gas flow path 64 is provided in the middle (in this case, between the reference-gas flow path 64a and the reference-gas flow path 64b) of the reference-gas flow path 64 of the reference-gas introduction section 62. Since at least part of the reference-gas flow path 64 is composed of a porous body, any of the one or more preliminary chambers does not directly communicate with the outside of the element body. Consequently, each preliminary chamber 65 plays a role as a buffer against change in the oxygen concentration in the reference gas, thus the change in the oxygen concentration around the reference electrode 42 is reduced.

The reference-gas introduction section 62 has the reference-gas chamber 63 in which the reference electrode 42 is disposed, and which has a diffusion resistance lower than that of the reference-gas flow path 64. Thus, as with the preliminary chamber 65, the reference-gas chamber 63 also fulfills the function as a buffer which reduces the change in the oxygen concentration around the reference electrode 42.

In addition, the capacity ratio of the total capacity of the preliminary chamber(s) 65 to the capacity of the reference-gas chamber 63 is 1.5 times or greater and 30 times or less. Since the capacity ratio is 1.5 times or greater, sufficient advantages of reducing the change in the oxygen concentration around the reference electrode 42 by the preliminary chamber 65 are obtained. Since the capacity ratio is 30 times or less, decrease in the strength of the element body 101a due to the presence of the preliminary chamber 65 can be reduced.

The present invention is not limited whatsoever to the above embodiment, and various embodiments are possible so long as they belong within the technical scope of the present invention.

Figure 6:
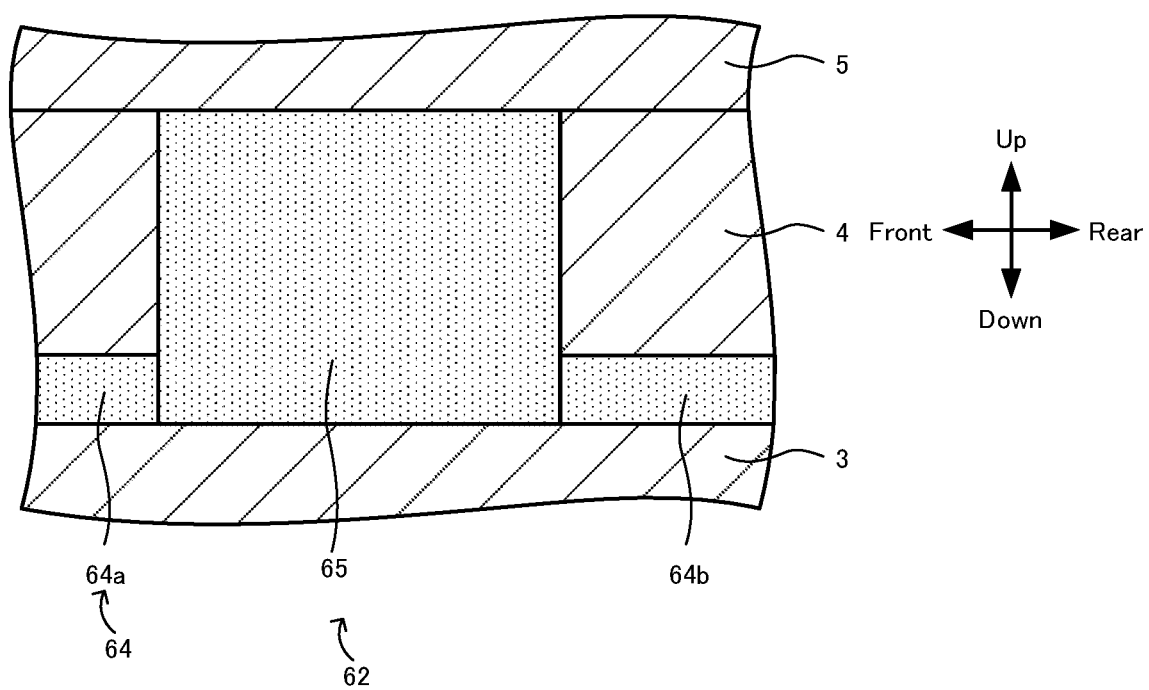
FIG. 6 is a partial cross-sectional view illustrating a preliminary chamber 65 according to a modification.

For example, in the above embodiment, the preliminary chamber 65 is a space, but the configuration is not limited thereto. As shown in FIG. 6, the preliminary chamber 65 may be filled with a porous body. In the example of FIG. 6, the preliminary chamber 65 may be filled with the same porous material as in the reference-gas flow path 64. In this case, the diffusion resistance of the preliminary chamber 65 can be expressed by the reciprocal of (average cross-sectional area×porosity). In addition, the capacity of preliminary chamber 65 is the product of the volume based on the shape of the preliminary chamber 65 and the porosity of the preliminary chamber 65. The porosity of the porous body filled in the preliminary chamber 65 may be 10 to 50%. Note that the space 149 may sometimes contain poisoning substances which poison the reference electrode 42. However, since the preliminary chamber 65 is filled with a porous body, the preliminary chamber 65 plays a role of trapping the poisoning substances. Consequently, poisoning substances can be prevented from reaching the reference electrode 42.

Figure 7:
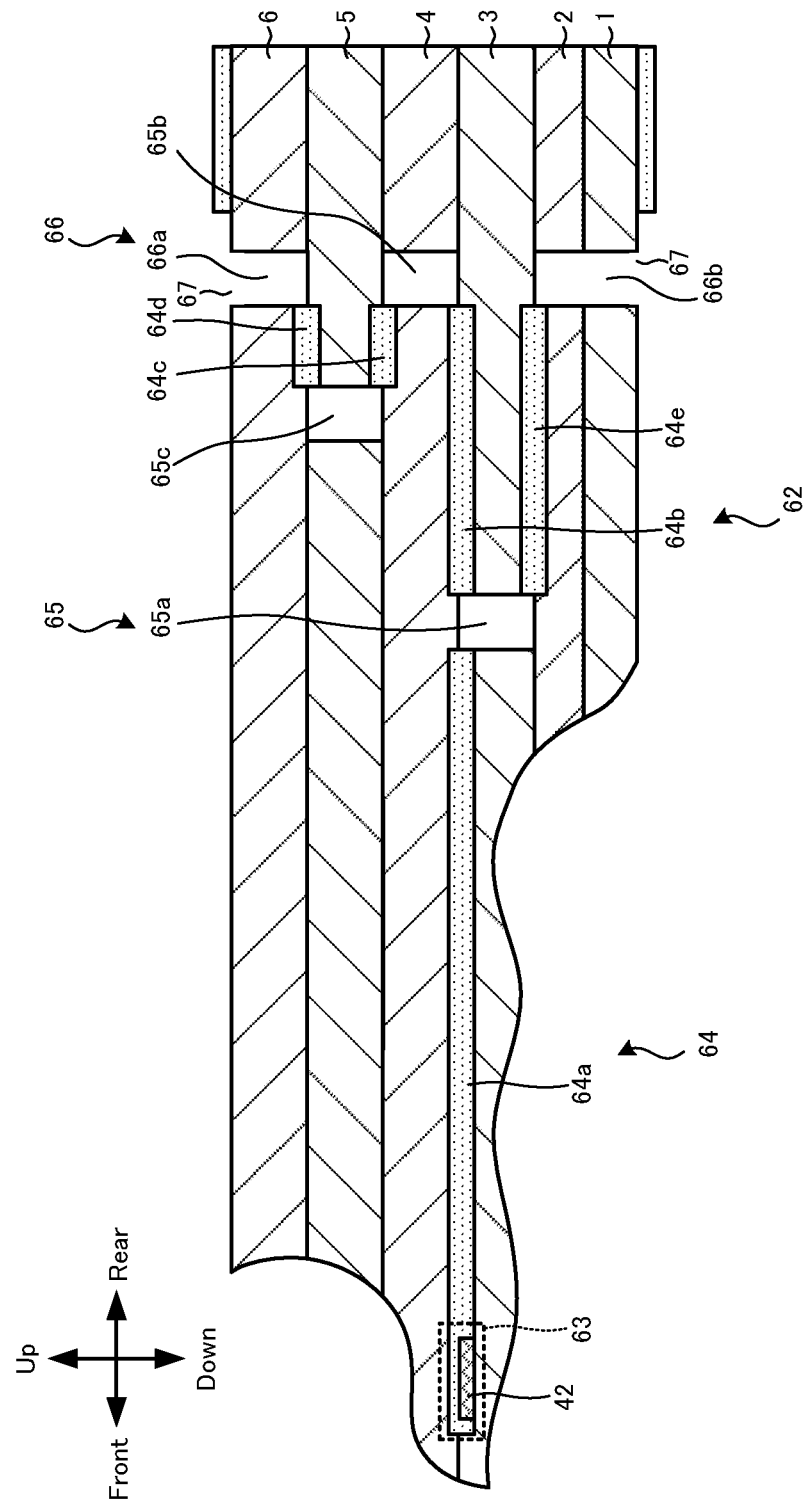
FIG. 7 is a partial cross-sectional view illustrating a reference-gas introduction section 62 according to a modification.

In the above embodiment, the reference-gas introduction section 62 includes only one preliminary chamber 65; however, the number of preliminary chambers may be one or greater. FIG. 7 is a partial cross-sectional view illustrating the reference-gas introduction section 62 according to a modification. The reference-gas introduction section 62 in FIG. 7 includes the reference-gas chamber 63, the preliminary chamber 65 having a plurality of preliminary chambers 65a to 65c, the reference-gas flow path 64 having reference-gas flow paths 64a to 64e, and reference-gas introduction space 66 having reference-gas introduction spaces 66a, 66b. The reference-gas flow paths 64a, 64b are provided between the first solid electrolyte layer 4 and the third substrate layer 3, the reference-gas flow path 64c is provided between the first solid electrolyte layer 4 and the spacer layer 5, the reference-gas flow path 64d is provided between the spacer layer 5 and the second solid electrolyte layer 6, and the reference-gas flow path 64e is provided between the second substrate layer 2 and the third substrate layer 3. The preliminary chamber 65a is a space provided in the third substrate layer 3, the preliminary chamber 65b is a space provided in the first solid electrolyte layer 4, and the preliminary chamber 65c is a space provided in the spacer layer 5. The reference-gas introduction space 66a is a hole provided in the second solid electrolyte layer 6, and the reference-gas introduction space 66b is a hole provided in the first substrate layer 1 and the second substrate layer 2. The reference-gas introduction spaces 66a, 66b are each open to the surface of the element body 101a, and each function as the entrance 67 to the reference-gas introduction section 62. That is, the reference-gas introduction section 62 in FIG. 7 has a plurality of entrances 67. In FIG. 7, an entrance 67 to the reference-gas introduction section 62 is present on surfaces (in this case, the upper surface and the lower surface) other than the rear end surface of the element body 101a. Like this, the number of entrances 67 is not necessarily one and may be plural, and as long as the entrance 67 is exposed to the space 149, the entrance 67 may be located on any surface of the element body 101a. As seen from FIG. 7, the reference gas introduced from the reference-gas introduction space 66a into the inside of the reference-gas introduction section 62 passes through the reference-gas flow path 64d, the preliminary chamber 65c, the reference-gas flow path 64c, the preliminary chamber 65b, the reference-gas flow path 64b, the preliminary chamber 65a, the reference-gas flow path 64a and the reference-gas chamber 63 in that order, and reaches the reference electrode 42. The reference gas introduced from the reference-gas introduction space 66b into the inside of the reference-gas introduction section 62 passes through the reference-gas flow path 64e, the preliminary chamber 65a, the reference-gas flow path 64a, and the reference-gas chamber 63 in that order, and reaches the reference electrode 42. The sizes of the preliminary chambers 65a to 65c are equal to each other in FIG. 7, but the sizes may be different from each other. When the preliminary chamber 65 includes a plurality of preliminary chambers 65a to 65c as in FIG. 7, the aforementioned capacity ratio is the ratio (=the total capacity of the preliminary chamber 65/the capacity of the reference-gas chamber 63) of the total of the capacities of the plurality of preliminary chambers 65a to 65c to the capacity of the reference-gas chamber 63. In this case, as mentioned above, the capacity ratio is preferably 1.5 times or greater and 30 times or less. The capacity ratio may be less than or equal to 8 times, or may be less than or equal to 4 times. When the preliminary chamber 65 includes a plurality of preliminary chambers like the preliminary chambers 65a to 65c, the capacity of each of the plurality of preliminary chambers may be less than or equal to 8 times the capacity of the reference-gas chamber, or may be less than or equal to 4 times the capacity. In FIG. 7, each of the plurality of preliminary chambers 65a to 65c is a space; however, one or more of the preliminary chambers 65a to 65c may be filled with a porous body as in FIG. 6. For example, when a case where one large preliminary chamber 65 is provided is compared with a case where a plurality of small preliminary chambers 65 are provided, if the total capacity of the preliminary chamber 65 is the same, the aforementioned functions as a buffer in both cases are comparable. However, decrease in the strength of the element body 101a can be more reduced when a plurality of small preliminary chambers 65 are provided. Therefore, with a plurality of preliminary chambers 65 in the reference-gas introduction section 62, decrease in the strength of the element body 101a can be reduced while reducing the change in the oxygen concentration around the reference electrode 42.

Figure 10:
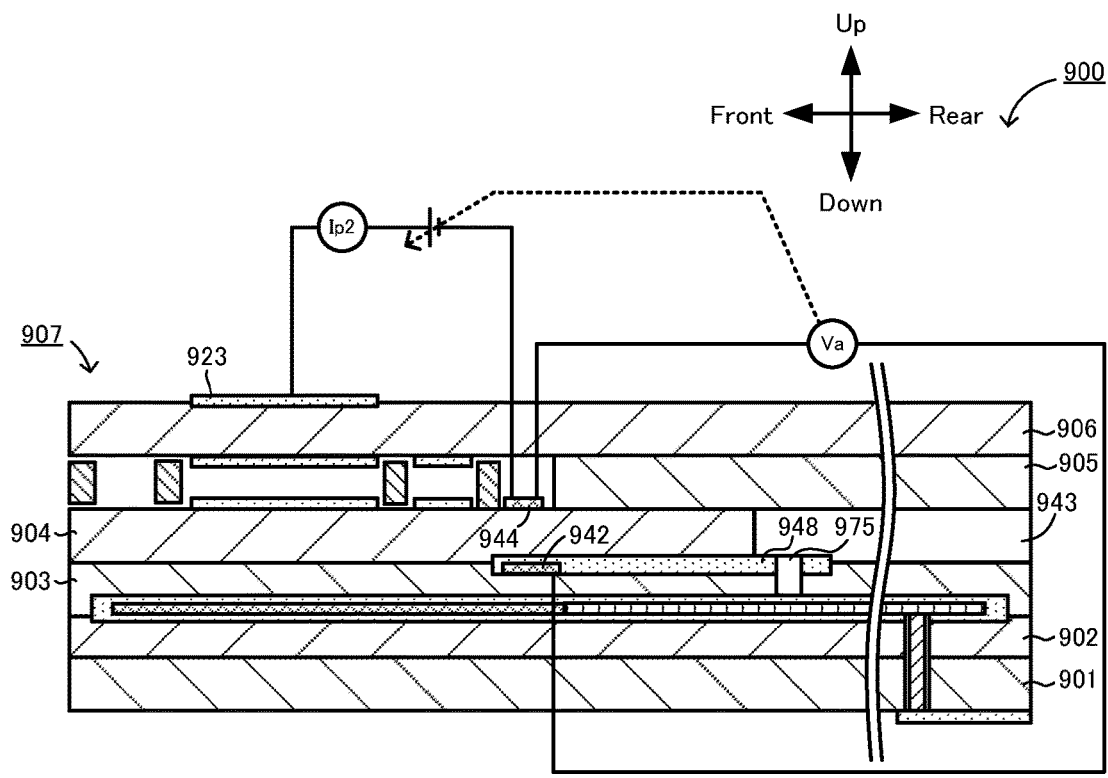
FIG. 10 is a schematic cross-sectional view schematically illustrating an example of the configuration of a gas sensor 900 in the related art.

Since the reference-gas flow path 64 composed of a porous body is provided between each of the preliminary chambers 65a to 65c in FIG. 7 and the outside of the element body 101a, any of the preliminary chambers 65a to 65c does not directly communicate with the outside of the sensor element 101. In contrast, each of the reference-gas introduction spaces 66a, 66b in FIG. 7 is open to the surface of the element body 101a, thus directly communicates with the outside of the element body. Thus, the reference-gas introduction spaces 66a, 66b are not a kind of the preliminary chamber 65, and distinguished from the preliminary chamber 65. Similarly, the reference-gas introduction space 943 in the sensor element 907 in the related art shown in FIG. 10 also directly communicates with the outside of the sensor element 907, thus is different from the preliminary chamber 65. The sensor element 907 in FIG. 10 includes a pressure diffusion hole 975 which penetrates the reference-gas introduction layer 948, and is open to the reference-gas introduction space 943. The pressure diffusion hole 975 is formed for the purpose of relaxing an internal pressure increase caused by temperature rise of the heater. The pressure diffusion hole 975 also directly communicates with the outside of the element body via the reference-gas introduction space 943, thus is different from the preliminary chamber 65.

In the above embodiment, the reference-gas chamber 63 is filled with a porous body, and the reference-gas flow path 64 is composed of a porous body, but the configuration is not limited thereto. For example, as with the preliminary chamber 65, the reference-gas chamber 63 may be formed as a space. At least part of the reference-gas flow path 64 may be composed of a porous body so that the preliminary chamber 65 does not directly communicate with the outside of the element body 101a. For example, even when part of the reference-gas flow path 64b in FIG. 2 is composed of a porous body, and the rest of the part is formed as a space, if the preliminary chamber 65 and the porous body are disposed so that movement of the reference gas from the preliminary chamber 65 to the outside of the element body 101a necessarily includes passing through the porous body in the reference-gas flow path 64b, it can be said that the preliminary chamber 65 "does not directly communicate with" the outside of the element body 101a. The reference-gas flow path 64a is not a flow path for the reference gas between the preliminary chamber 65 and the outside of the element body 101a, thus the whole reference-gas flow path 64a may be formed as a space. When the reference-gas introduction section 62 includes a plurality of preliminary chambers 65 as in FIG. 7, at least part of the reference-gas flow path 64 may be composed of a porous body so that any of the plurality of preliminary chambers 65 does not directly communicate with the outside of the element body 101a. When part of the reference-gas flow path 64 or the reference-gas chamber 63 is formed as a space, at the time of manufacturing the sensor element 101, a pattern of the shape of the space may be formed using, for example, a paste composed of a disappearing material (e.g., theobromine).

Figure 8:
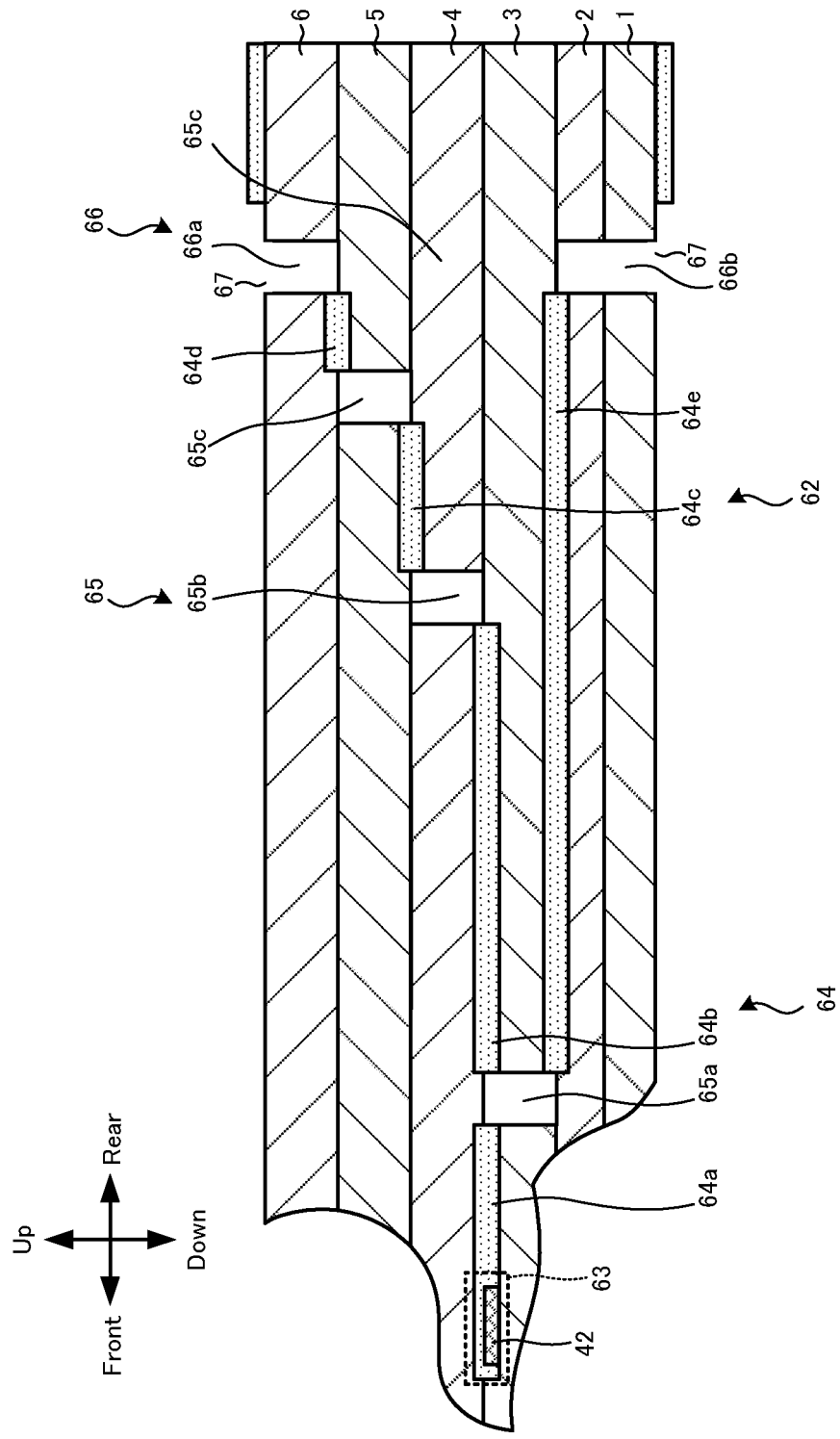
FIG. 8 is a partial cross-sectional view illustrating a reference-gas introduction section 62 according to a modification.

In the above embodiment and the example shown in FIG. 7, each of the plurality of preliminary chambers 65 is located on the rear-end side of the element body 101a, but the configuration is not limited thereto. For example, the reference-gas introduction section 62 may be configured as in FIG. 8. In FIG. 8, the preliminary chamber 65a is located at a position of the element body 101a, closer to the reference electrode 42, more specifically, located on the front-end side with respect to the center the element body 101a in the front-rear direction. Like this, one or more of the plurality of preliminary chambers 65 may be located on the front-end side with respect to the center the element body 101a in the front-rear direction. The plurality of preliminary chambers 65 may be disposed at regular intervals in the front-rear direction.

Figure 9:
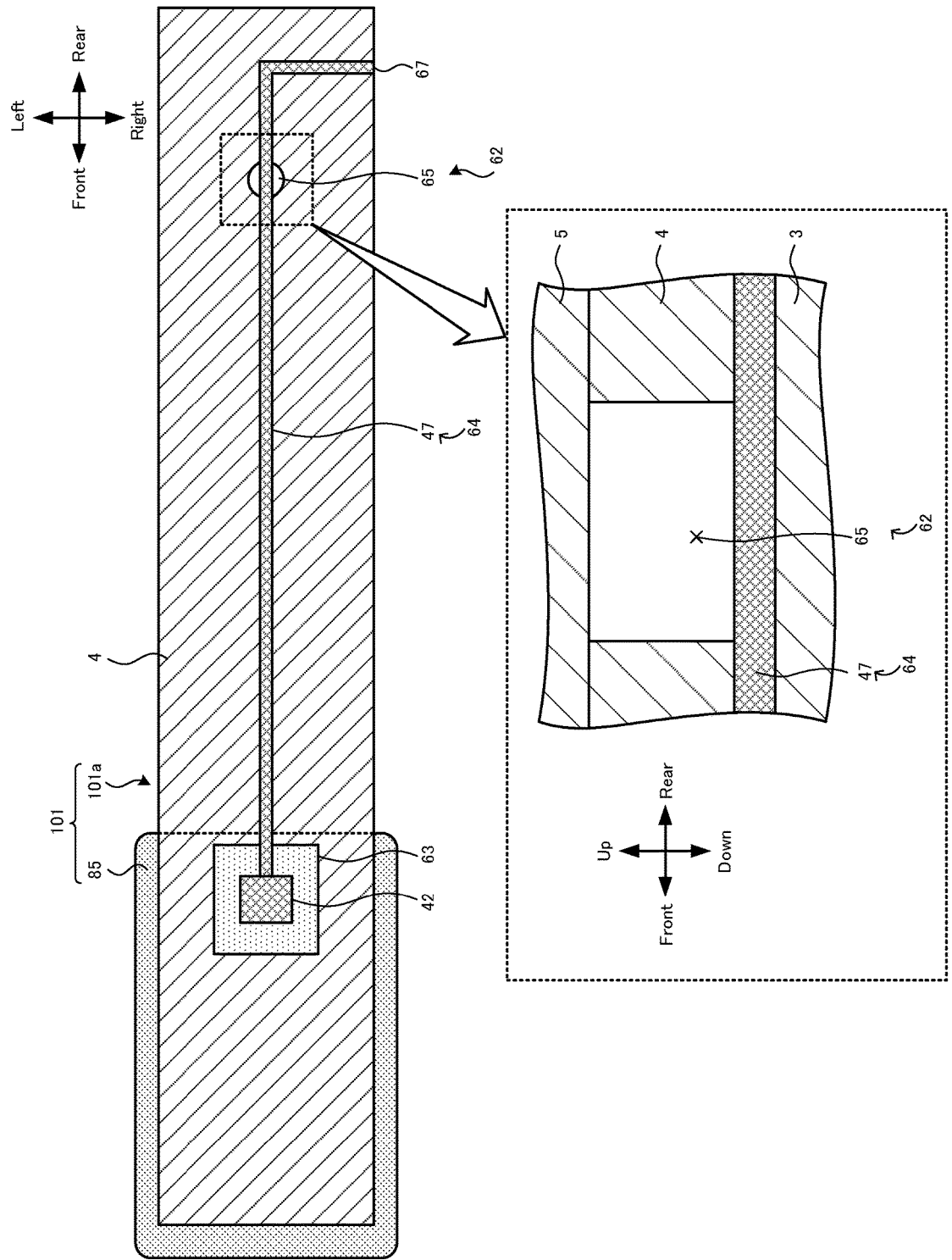
FIG. 9 is a partial cross-sectional view illustrating a reference-gas introduction section 62 according to a modification.

In the above embodiment, the reference electrode lead 47 is wired to bypass the preliminary chamber 65; however, the reference electrode lead 47 may be wired to pass through the preliminary chamber 65 (exposed into the preliminary chamber 65) without bypassing it. Alternatively, the reference electrode lead 47 may serve as at least part of the reference-gas flow path 64. FIG. 9 is a cross-sectional view illustrating the reference-gas introduction section 62 according to a modification. Unlike FIG. 4, FIG. 9 illustrates a section including the reference-electrode 42 and the reference electrode lead 47 of the sensor element 101. The reference-gas introduction section 62 in FIG. 9 does not include the reference-gas flow paths 64a, 64b, but instead, the reference-electrode lead 47 serves as the reference-gas flow path 64. When the reference electrode lead 47 is composed of a porous body, the reference gas can be flowed, thus the reference electrode lead 47 can serve as the function of the reference-gas flow path 64. When the reference electrode lead 47 serves as the reference-gas flow path 64, if the reference-gas flow path 64 is divided by the preliminary chamber 65 as in the above embodiment, conduction between the reference electrode 42 and the connector electrode 69 cannot be ensured. Thus, in the example of FIG. 9, the reference-gas flow path 64 (the reference electrode lead 47) is not divided and is disposed so as to pass through the preliminary chamber 65 (exposed into the preliminary chamber 65). In other words, the preliminary chamber 65 is disposed so as to be in contact with the reference-gas flow path 64 in the middle thereof. In this case, the reference gas flowing through the reference-gas flow path 64 is diffused to the preliminary chamber 65 having a diffusion resistance lower than that of the reference-gas flow path 64, thus as in the above embodiment, the preliminary chamber 65 can play a role as a buffer against the change in the oxygen concentration in the reference gas. In the example of FIG. 9, a portion of the reference electrode lead 47 functions as the entrance 67 of the reference-gas introduction section 62, the portion being exposed to the right-side surface of the element body 101a.

In the above embodiment, each of the reference-gas chamber 63 and the reference-gas flow path 64 (64a, 64b) has a constant right-to-left width, but the configuration is not limited thereto. For example, the width of the reference-gas flow path 64a may gradually change in the front-rear direction, or part of the reference-gas flow path 64a may have a width different from the width of the rest of the part. As described above, the diffusion resistance of the reference-gas chamber 63 and the reference-gas flow path 64 is expressed as the reciprocal of the average cross-sectional area, thus the diffusion resistance can be calculated even with non-uniform width.

In the above embodiment, the reference-gas introduction section 62 has the reference-gas chamber 63 having a diffusion resistance lower than that of the reference-gas flow path 64, but the configuration is not limited thereto. For example, in the above embodiment, the diffusion resistance of the reference-gas chamber 63 is set to the same diffusion resistance as the reference-gas flow path 64 by setting the width of the reference-gas chamber 63 to the same width as the reference-gas flow path 64, and part of the reference-gas flow path 64 may serve as the reference-gas chamber 63 (in other words, the reference-gas chamber 63 is omitted), and the reference electrode 42 may be covered with the reference-gas flow path 64.

In the above embodiment, the element body 101a is a layered body having a plurality of solid electrolyte layers (layers 1 to 6), but is not limited thereto. The element body of the sensor element 101 may include at least one oxygen-ion-conductive solid electrolyte layer. For example, one or more of the layers 1 to 6 may be structural layers (e.g., layers composed of alumina) composed of a material other than that of solid electrolyte layers. When one or more of the layers 1 to 6 are changed to structural layers composed of alumina, since alumina has a higher thermal conductivity than zirconia of which the solid electrolyte layer is composed, the temperature of the element body 101a can be raised by the heater 72 in a short time, thus the solid electrolyte in the element body 101a can be activated at an early stage when the sensor element 101 is used. When the element body 101a is provided with structural layers, the positions of the electrodes 22, 23, 51, 44, 42 in the above embodiment may be changed as appropriate so that the electrodes are disposed on the surfaces of the solid electrolyte layers, but not on the structural layers. From the viewpoint of ensuring the strength of the element body 101a, the preliminary chamber 65 is preferably not provided in the structural layers, but provided in the solid electrolyte layers. Thus, of the element body 101a, layers adjacent to a layer provided with the preliminary chamber 65 may be structural layers. For example, in FIG. 7, FIG. 8, the first substrate layer 1, the second substrate layer 2 and the second solid electrolyte layer 6 which are not provided with the preliminary chamber 65 may be changed to structural layers composed of alumina. Alternatively, in FIG. 7, FIG. 8, structural layers are respectively added on the second solid electrolyte layer 6 and beneath the first substrate layer 1 so that the layers 1 to 6 are sandwiched by the structural layers. In this case, the reference-gas introduction space 66 may penetrate the structural layers and open to the surfaces (the upper surface and the lower surface) of the element body 101a, or may open to the right and left lateral surfaces of the element body 101a. When a structural layer is added on the second solid electrolyte layer 6, it is preferable to adopt a structure which allows the measurement-object gas (particularly, oxygen) to flow between the outer pump electrode 23 and the sensor element chamber 133. For example, part of the structural layers, which covers the outer pump electrode 23, may be porous. Part of the structural layers may be provided with a hole which serves as a flow path for oxygen between the outer pump electrode 23 and the sensor element chamber 133.

In the above embodiment, the pump current Ip3 is a fixed direct current, but is not limited thereto. For example, the pump current Ip3 may be a pulsed intermittent current. Furthermore, the pump current Ip3 is a fixed direct current that constantly flows in the direction in which oxygen is pumped in toward the periphery of the reference electrode 42 in the above embodiment, but is not limited thereto. For example, there may be a time period in which the pump current Ip3 flows in the direction in which oxygen is pumped out from the periphery of the reference electrode 42. Even in that case, the overall moving direction of the oxygen may be the direction in which the oxygen is pumped in toward the periphery of the reference electrode 42 in view of a sufficiently-long predetermined time period.

In the aforementioned sensor element 101, the circuit of the reference-gas adjustment pump cell 90 may be omitted, or the gas sensor 100 does not have to be equipped with the power supply circuit 92. Furthermore, the gas sensor 100 does not have to be equipped with the control device 95. For example, in place of the control device 95, the gas sensor 100 may include an external connector attached to the lead wires 155 and used for connecting the control device 95 and the lead wires 155.

In the above embodiment, the reference gas is atmospheric gas, but is not limited thereto so long as the gas serves as a reference for detecting the concentration of a specific gas in the measurement-object gas. For example, the space 149 may be filled with a gas that has been adjusted to a predetermined oxygen concentration (> the oxygen concentration of the measurement-object gas) as the reference gas.

In the above embodiment, the NOx concentration in the measurement-object gas is detected by the sensor element 101, but is not limited thereto so long as the concentration of a specific gas in the measurement-object gas is detected. For example, instead of NOx, the concentration of another oxide may be detected as the specific gas concentration. If the specific gas is an oxide, oxygen is produced when the specific gas itself is reduced in the third internal cavity 61 similarly to the above embodiment, so that the measurement pump cell 41 can acquire a detection value (e.g., the pump current Ip2) according to this oxygen and detect the specific gas concentration. Furthermore, the specific gas may be a non-oxide, such as ammonia. If the specific gas is a non-oxide, the specific gas is converted into an oxide (e.g., is converted into NO in the case of ammonia), so that oxygen is produced when the converted gas is reduced in the third internal cavity 61. Thus, the measurement pump cell 41 can acquire a detection value (e.g., the pump current Ip2) according to this oxygen and detect the specific gas concentration. For example, the inner pump electrode 22 in the first internal cavity 20 functions as a catalyst, so that the ammonia can be converted into NO in the first internal cavity 20.

What is claimed is:

1. A gas sensor element comprising:
   an element body having an oxygen-ion-conductive solid electrolyte layer and provided with a measurement-object gas flow section therein, the measurement-object gas flow section introducing a measurement-object gas and causing the measurement-object gas to flow therethrough;

a reference electrode disposed inside the element body; and a reference-gas introduction section that is disposed inside the element body, and causes a reference gas to flow to the reference electrode, the reference gas serving as a reference for detecting a specific gas concentration in the measurement-object gas, wherein the reference-gas introduction section has a reference-gas flow path, and one or more preliminary chambers which are disposed in a middle of the reference-gas flow path, and have a diffusion resistance lower than a diffusion resistance of the reference-gas flow path, and at least part of the reference-gas flow path is composed of a porous body wherein the reference gas from an outside of the element body flows through the porous body to any of the one or more preliminary chambers.

2. The gas sensor element according to claim 1, wherein the reference-gas introduction section has a reference-gas chamber in which the reference electrode is disposed, and which has a diffusion resistance lower than the diffusion resistance of the reference-gas flow path.

3. The gas sensor element according to claim 2, wherein a capacity ratio of a total of capacities of the one or more preliminary chambers to a capacity of the reference-gas chamber is 1.5 times or greater and 30 times or less.

4. The gas sensor element according to claim 1, wherein the reference-gas introduction section has a plurality of preliminary chambers each of which is the one or more preliminary chambers.

5. The gas sensor element according to claim 1, wherein each of the one or more preliminary chambers is a space or is filled with a porous body.

6. A gas sensor comprising the gas sensor element according to claim 1.

7. The gas sensor element according to claim 3, wherein the capacity ratio is 8 times or less.

8. The gas sensor element according to claim 3, wherein the capacity ratio is 4 times or less.

9. The gas sensor element according to claim 2, wherein the capacity of each of the one or more preliminary chambers is less than or equal to 8 times the capacity of the reference-gas chamber.

10. The gas sensor element according to claim 2, wherein the capacity of each of the one or more preliminary chambers is less than or equal to 4 times the capacity of the reference-gas chamber.

* * * * *